United States Patent [19]

Henshaw et al.

[11] Patent Number: 5,319,629
[45] Date of Patent: Jun. 7, 1994

[54] CONTENT ADDRESSABLE OPTICAL DATA STORAGE SYSTEM

[75] Inventors: Philip D. Henshaw, Carlisle; Steven A. Lis, Needham, both of Mass.

[73] Assignee: Sparta, Inc., Lexington, Mass.

[21] Appl. No.: 915,921

[22] Filed: Jul. 17, 1992

Related U.S. Application Data

[63] Continuation-in-part of Ser. No. 664,767, Mar. 5, 1991, Pat. No. 5,191,574, which is a continuation-in-part of Ser. No. 236,604, Aug. 25, 1988, Pat. No. 4,998,236.

[51] Int. Cl.$^5$ .............................................. G11C 13/04
[52] U.S. Cl. ..................................... 369/103; 365/125
[58] Field of Search ................. 269/100, 103, 112; 365/216, 107, 125, 126, 127, 119, 118, 49

[56] References Cited

U.S. PATENT DOCUMENTS

| | | | |
|---|---|---|---|
| 3,428,814 | 2/1969 | Doonan | 250/214 |
| 3,572,881 | 3/1971 | Nishida | 365/125 |
| 3,766,533 | 10/1973 | Black et al. | 365/125 |
| 3,771,150 | 11/1973 | Schneider | 340/173 |
| 3,810,108 | 5/1974 | Krewson et al. | 365/125 |
| 3,829,838 | 8/1974 | Lewis et al. | 340/172 |
| 3,902,788 | 9/1975 | Strehlow | 365/109 |
| 4,034,355 | 7/1977 | Carlsen | 365/216 |
| 4,038,647 | 7/1977 | Schneider | 340/173 |
| 4,041,476 | 8/1977 | Swainson | 340/173 |
| 4,052,706 | 10/1977 | Spitz et al. | 365/125 |
| 4,101,976 | 7/1978 | Castro et al. | 365/119 |
| 4,103,346 | 7/1978 | Haarer et al. | 365/216 |
| 4,288,861 | 9/1981 | Swainson et al. | 365/127 |
| 4,318,581 | 3/1982 | Guest et al. | 365/125 |
| 4,701,879 | 10/1987 | Scarr | 365/126 |
| 4,860,253 | 8/1989 | Owechko et al. | 365/125 |

OTHER PUBLICATIONS

Tsarkis, "Electro-Optic SLM-based Architecture for Ternary, Phase/Amplitude Filtering," Applied Optics vol. 30 No. 32, Nov. 1991, pp. 4596–4598.
Yariv, "Quantum Well Semiconductor Lasers Are Taking Over," IEEE, Nov. 1989, pp. 25–28.
Chisvin et al., "Content-Addressable and Associative Memory," IEEE, Jul. 1989, pp. 51–64.
Trommsdorff, "Spectral Holes Burning in Polysilanes," J. Chem. Phys. vol. 89(7), Oct. 1988, pp. 4440–4441.
Moerner, ed., Persistent Spectral Hole Burning: Science and Applications, Springer-Verlag, Jun. 1988, pp. 1–15, 65–77, 114–125, 265–304.
Psaltis, Optical Neural Computers, Feb. 1988.
Kosko, "Bidirectional Associative Memories," IEEE 18(1), Feb. 1988, pp. 49–60.
Renn et al., "Spectral Hole Burning and Hologram Storage," Applied Optics 26(19), Nov. 1987, pp. 4040–4042.
Wu et al., "Effect of Size Nonuniformity on the Absorption Spectrum . . . ," Appl. Phys Lett 51(10), Sep. 1987, pp. 710–712.
Kubena et al., "Dot Lithography for Zero-dimensional Quantum Wells . . . ," Appl Phys Lett 50(22), Jun. 1987, pp. 1589–1591.

(List continued on next page.)

Primary Examiner—Paul M. Dzierzynski
Assistant Examiner—Kiet T. Nguyen
Attorney, Agent, or Firm—Thomas J. Engellenner; John V. Bianco

[57] ABSTRACT

A multidimensional optical storage medium is provided for storing a plurality of holographic images representative of data. An interrogation network generates a search argument including a target data field to be simultaneously searched for over at least a segment of the optical storage medium. The interrogation network couples the search argument into the optical storage medium and extracts a set of address fields at which data fields in the storage medium that match the target data field of the search argument are stored.

61 Claims, 11 Drawing Sheets

OTHER PUBLICATIONS

Temkin et al., "Low-Temperature Photoluminescence from InGaAs/InP Quantum Wires and Boxes," Appl Phys Lett 50(7), Feb. 1987, pp. 413–415.

Cibert et al., "Optically Detected Carrier Confinement to one and zero Dimension . . . ," Appl Phys Lett 49(19), Nov. 1986, pp. 1275–1277.

Kash et al., "Optical Spectroscopy of Ultrasmall Structures Etched From Quantum Wells," Appl Phys Lett 49(16), Oct. 1986, pp. 1043–1045.

Moerner et al., "Can Single-Photon Processes Provide Useful Material for Frequency-Domain Optical Storage," Opt Soc Am 2(6), Jun. 1985, pp. 915–923.

Renn et al., "Holographic Detection of Photochemical Holes," Chem Phys 93, Jun. 1985, pp. 157–162.

Wild et al., "Hole Burning, Stark Effect, and Data Storage," Applied Optics, 24(10), May 1985, pp. 1526–1530.

Gutierrez et al., "Multiple Photochemical Hole Burning in Organic Glasses and Polymers . . . ," IBM J Res Develop 26(2), Mar. 1982, pp. 198–208.

MacWilliams et al., "Pseudo-Random Sequences and Arrays," IEEE 64(12), Dec. 1976, pp. 1715–1729.

Collier et al., Optical Holography, Academic Press, Feb. 1971, pp. 454–493.

Leith et al., "Holographic Data Storage in Three Dimensional Media," Applied Optics 5(8), Aug. 1966, pp. 1303–1311.

Goodman, Introduction to Fourier Optics, McGraw-Hill, pp. 170–185, Dec. 1985

Mee et al., "Magnetic Recording Vol. II: Computer Data Storage," pp. 242–304, Jun. 1988.

Kohonen, "Self-Organization and Associative Memory," (Springer-Verlag, Berlin Heidelberg New York Tokyo eds., Jul. 1984, pp. 83–89.

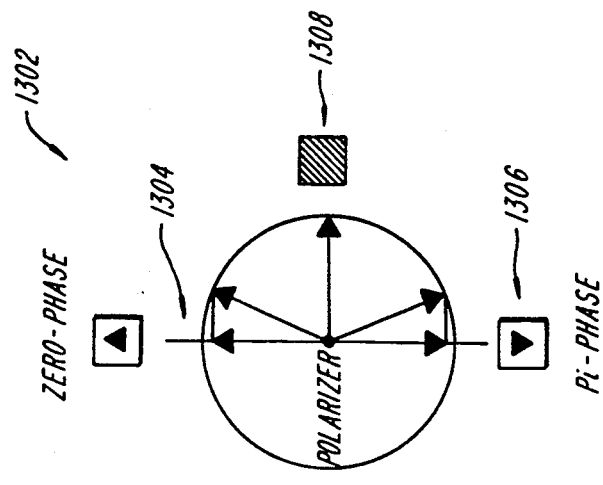
FIG. 13C
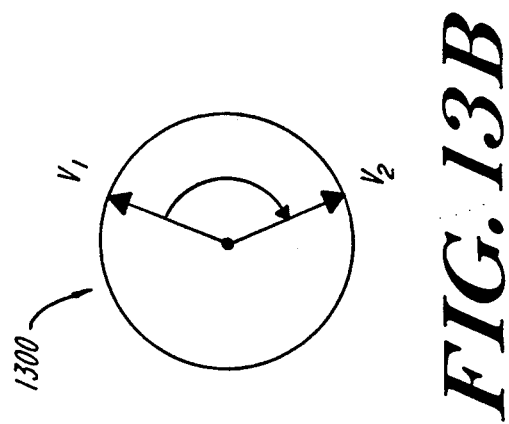
FIG. 13B
FIG. 13A

CONTENT ADDRESSABLE OPTICAL DATA STORAGE SYSTEM

REFERENCE TO RELATED PATENTS

This application is a continuation-in-part of pending U.S. patent application Ser. No. 07/664,767 filed Mar. 5, 1991, entitled "Optical Memory Method and Apparatus Utilizing Frequency Channeling and Stark Effect," now U.S. Pat. No. 5,191,574, which is itself a continuation-in-part of U.S. patent application Ser. No. 07/236,604 filed Aug. 25, 1988 entitled "Apparatus For High Density Holographic Optical Data Storage," now U.S. Pat. No. 4,998,236. The teachings of the above cited patent application and patent are incorporated herein by reference.

BACKGROUND OF THE INVENTION

This invention relates generally to holographic memories. More particularly, it relates to methods and apparatus for implementing a content addressable holographic memory.

Traditionally, computers have utilized location addressable memory devices. Location addressable memories are accessed by specifying an address for a memory location where data is stored. Such memory devices have included semiconductor memories, magnetic tapes and disks, and optical disks. As computers have become more powerful, both the storage capacity of memory devices and the speed increased. Nevertheless, a limiting factor with respect to the speed at which a computer can operate remains the time that is required to access data stored in memory.

One factor that renders location addressable memories inherently slow is that each location must be accessed individually. This inherent slowness of traditional memories is even more apparent during computations that require database sorting or searching. Such sorting and searching applications become even more time consuming as the size of the database becomes increasingly large.

Designers use various approaches to minimize the long search times associated with location addressable memories. One approach is to utilize search algorithms, such as hash coding, that minimize the number of comparisons that need be performed. Another approach is to utilize hardware architectures, such as pipelining, that enable multiple comparisons to take place simultaneously. However, as the processing speed of computers has increased, these approaches have become ineffective.

The disadvantages of traditional memories are most apparent in modern parallel processing computers. Parallel processing computers employ multiple processor units and exploit application parallelisms to decrease their execution time. Since location addressable memories are accessed serially, those memories create serious data flow bottlenecks in computers which utilize massively parallel architectures.

Content addressable memories (CAMs) have developed in response to this problem. In a CAM, data is accessed based on the data itself, as opposed to the address corresponding to its storage location. In a CAM based system, as in a traditional system, the processor presents a search argument to the CAM. However, unlike a traditional memory, the CAM simultaneously compares the search argument with the contents of a plurality of storage locations in the CAM. Upon identifying a match, the CAM couples the matching data to the processor. Theoretically, such a system reduces any number of comparisons down to one comparison. Consequently, the time to locate any particular search argument is independent of the size of the database being searched. However, in reality CAM based systems suffer from several problems.

In some conventional memory systems, the memory to be searched is read into a processor thus, placing practical limitations on the size of the memory which can be searched simultaneously. In other prior art systems, the processor accesses the memory by way of a pre-defined index of key words and phrases. This is done to reduce the input/output bandwidth requirements of the memory. Consequently, either the memory must have an extremely large bandwidth, or searches can only be performed using a limited set of key words.

Disadvantages of existing CAMs are that they are expensive to build and have substantially lower storage density than do location addressable memories. This results from the overhead circuitry required to perform comparisons, manipulations, and output selection.

Consequently, one object of the present invention is to provide a content addressable memory system which eliminates the need to read the contents of the memory into a digital data processor prior to being able to search the memory.

An additional object of the invention is to provide a content addressable memory system having an improved storage capacity.

Another object of the invention is to provide a content addressable memory system with improved access time while reducing the input/output bandwidth requirements of the memory.

A further object of the invention is to provide a content addressable memory system wherein the memory is addressable without using a previously prepared index of key words and phrases.

An additional object is to provide a content addressable memory system having a relatively inexpensive cost per on-line megabyte of memory.

Other general and specific objects of the invention will in part be obvious and will in part appear hereinafter.

SUMMARY OF THE INVENTION

The foregoing objects are attained by the invention, which provides methods and apparatus for addressable storage and retrieval of data. In one aspect of the invention, a multidimensional optical storage medium is provided for storing a plurality of holographic images representative of data. An interrogation network generates a search argument, including a target data field, to be simultaneously searched for over at least a segment of the optical storage medium. The interrogation network couples the search argument into the optical storage medium and extracts a set of address fields at which data fields in the storage medium that match the target data field of the search argument are stored.

According to one embodiment, the storage medium is a spectral hole burning (SHB) material having an address field which includes a wavelength address and a Bragg angle address. The wavelength address specifies a wavelength of light at which a particular data field in the optical storage medium is stored. The Bragg angle address specifies an angle of incidence of a reference light beam at which a particular data field in the optical storage element is stored.

The interrogation network can include a spatial light modulator element, a broadband light source, and a light sensitive output plane. The broadband light source provides a light beam including a plurality of wavelengths thereby permitting simultaneous searching of a plurality of wavelengths. The spatial light modulator creates a pattern which presents the target data field to the optical storage medium at a plurality of Bragg angle addresses. The Bragg angle addresses in combination with the wavelength addresses, provided by the broadband light source, define the segment of the storage medium being searched. The light sensitive output plane is optically coupled to the optical storage medium and produces electrical output signals in response to the location at which one or more light beams are incident upon the light sensitive plane.

In one embodiment of the invention, the spatial light modulator encodes the target data field as an array of ordered pairs of essentially bright and essentially dark pixels, which can correspond to encoded data fields stored in the storage medium. A data bit having a first logical state is encoded as an ordered pair consisting of an essentially dark pixel and an essentially bright pixel, and a data bit having a second logical state is encoded as an ordered pair consisting of an essentially bright pixel and an essentially dark pixel. The spatial light modulator impresses the encoded target data field onto the broadband light beam.

According to another aspect of the invention, the spatial light modulator can include an array of liquid crystal spatial light modulator elements, wherein each of the elements corresponds to either an essentially bright pixel or an essentially dark pixel to be impressed onto the broadband light beam. Each of the spatial light modulator elements can include an element, responsive to a voltage control signal, for impressing an essentially bright pixel onto the broadband light beam by either rotating the broadband light beam by a first polarization and passing it through the spatial light modulator element, or by rotating the broadband light beam by a second polarization and passing it through the spatial light modulator element. Each of the spatial light modulator elements can further include an element, responsive to the voltage control signal for impressing an essentially dark pixel onto the broadband light beam by blocking the broadband light beam from passing through the spatial light modulator element.

The optical storage medium, in response to application of the search argument, generates one or more light beams and couples those beams onto the light sensitive output plane. The position at which each of the light beams is incident upon the output plane is indicative of the Bragg angle component of an address field in the optical storage medium at which the target data field is stored. A plurality of light beams indicates that the search argument is stored at that plurality of Bragg angles.

A dispersion grating element, positioned between the storage medium and the output plane, diffracts each of the light beams into two beams. The distance between the points at which the two light beams are incident on the light sensitive plane is indicative of the wavelength component of the address field in the optical storage medium at which the target data field is stored. The invention provides a distinguishable wavelength address component for each identified Bragg angle address component.

According to another embodiment, the invention provides an optical data storage system for writing and reading data out of and into a multidimensional optical storage medium. A variable wavelength laser element couples to the storage medium and generates a coherent beam of light at a specified wavelength address. A steering element couples between the variable wavelength laser element and the storage element and steers the coherent beam of light, over a first optical path, to the storage medium at a specified Bragg angle address. The system also includes a data specifying element coupled between the variable wavelength laser element and the storage medium, and modulates a data field, comprising an array of data bits to be written into said storage medium, onto the coherent light beam, and couples the coherent light beam, over a second optical path, to the storage medium.

In this embodiment, the data specifying element can include an element for encoding the data field as an array of ordered pairs of essentially bright and essentially dark pixels, wherein the data bits having a first logical state are encoded as an ordered pair consisting of an essentially dark pixel and an essentially bright pixel, and the data bits having a second logical state are encoded as an ordered pair consisting of an essentially bright pixel and an essentially dark pixel. Alternatively, the data specifying element includes an array of liquid crystal spatial light modulator elements wherein each spatial light modulator element, in response to a voltage control signal, impress an essentially bright pixel onto the coherent beam of light by either rotating the beam of light by a first polarization and passing it through the modulator element, or by rotating the beam of light by a second polarization and passing it through the modulator element. Each modulator element also includes an element, responsive to the voltage control signal, for impressing an essentially dark pixel on the beam of light by blocking the light from passing through According to further embodiment, the invention provides an optical interconnection system, such as that employed in neural networks, for storing an interconnection matrix for selectably interconnecting an input memory plane and an output memory plane, each plane having a set of memory cells arranged in two dimensions. The optical interconnection system includes elements for storing bits of data as ordered pairs of essentially bright pixels and essentially dark pixels. The system also includes liquid crystal spatial light modulator elements that generate the essentially bright pixels and the essentially dark pixels.

In other aspects of the invention, further applications of holographic memories to neural networks are disclosed, as well as additional for holographic storage.

BRIEF DESCRIPTION OF THE DRAWINGS

For a fuller understanding of the nature and objects of the invention, reference should be made to the following detailed description and the accompanying drawings, in which:

FIGS. 13A–13C are graphical illustrations of the operation of a liquid crystal spatial light modulator of the type employed by the invention.

DETAILED DESCRIPTION

Content Addressable Memories (CAMs) perform three basic functions: simultaneous broadcast and comparison of a search argument to a plurality of storage locations in a memory medium, identifying storage locations the contents of which match the search argument, and facilitating access to the contents of the identified storage locations. CAMs are well suited for many database processing applications. Examples of such applications include topical information retrieval, list and string processing, relational database processing, and language translation. However, CAMs used for database processing should have a relatively large storage capacity, and should have relatively fast access speeds.

Because of the distributed nature of the data stored in a holographic memory, the parallel nature of optical signals, and its voluminous (e.g., terabyte) storage capacity, a holographic memory, of the type disclosed in U.S. Pat. No. 4,998,236 and/or commonly-owned copending U.S. patent application Ser. No. 07/664,767, now U.S. Pat. No. 5,191,574, is extremely well suited for a CAM system.

Figure 1:
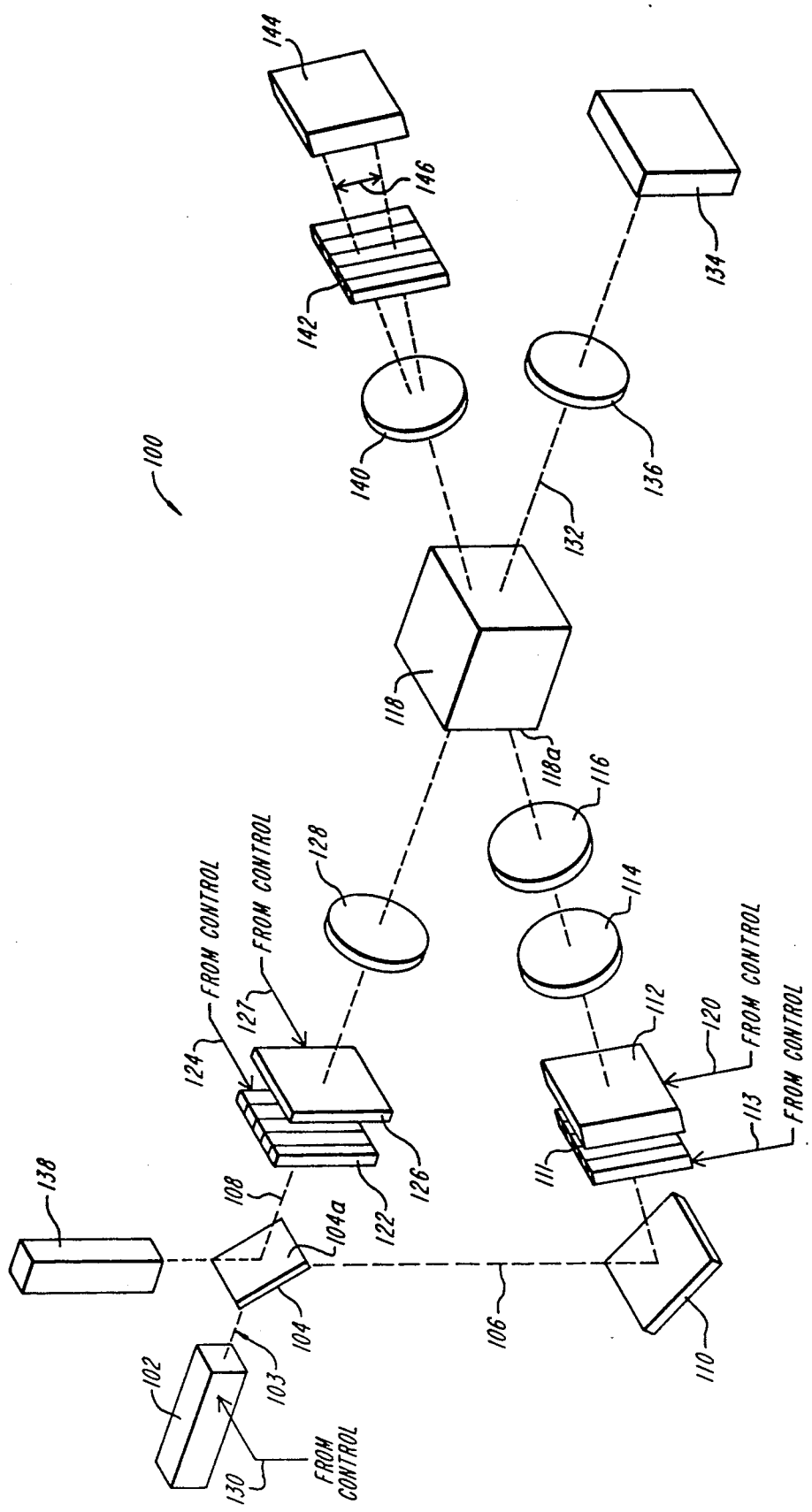
FIG. 1 is a schematic diagram depicting a content addressable holographic memory system according to the invention.

FIG. 1 is a schematic diagram depicting a holographic CAM system 100 according to the invention. According to a preferred embodiment, the system 100 is capable of storing data holographically. It is also capable of retrieving holographically stored data, by employing both a conventional addressing approach and also a content addressing approach.

The memory system 100 includes a tunable laser 102 coupled to a beamsplitter 104. The tunable laser 102 generates a coherent beam of light 103 and transmits that beam to the beamsplitter 104. The beamsplitter 104 splits the beam 103 into two mutually coherent beams: reference beam 106 and data beam 108. Mirror 110 directs the reference beam 106 into the reference beam deflection assembly 112 by way of the shutter element 111. An externally applied control signal 113 signals the shutter 111 to open during writing and reading of data at a specific address and to close during CAM operation. The deflection assembly 112 couples the reference beam 106 through the relay optics 114 and 116 into the holographic memory element 118 at a plurality of discrete deflection angles (hereinafter Bragg angles). Those angles are typically measured with respect to surface plane 118a of the holographic memory element 118. According to a preferred embodiment, the deflection assembly 112 varies the angle of deflection of the reference beam 106 in response to externally applied control signals 120.

The beam 106 is used as the reference beam during the writing of data to the memory element 118 in a holographic format. The beam 106 is also used as the reconstruction beam during conventional address based reading of data stored in the memory element 118.

The beamsplitter 104 couples the data beam 108 to the read/write shutter 122. During a memory write operation, an externally applied control signal 130 signals the variable frequency laser 102 to produce a light beam 103 having a particular wavelength address. Additionally, an externally applied control signal 124 signals the shutter 122 to open, thereby coupling the data beam 108 to the data specifying plane 126. The data specifying plane 126 include either a transmissive or a reflective spatial light modulator which carries a pattern of data in the form of a two-dimensional array of bright and dark pixels. According to one preferred embodiment of the invention, the spatial light modulator is a spatially-variable transparency which encodes a 1000 X 1000 array of data bits. According to other preferred embodiments, the spatial light modulator can be a liquid crystal device or a ferro-electric device. The contents of the array are programmable by way of the control signals 127. The plane 126 impresses the array of data bits onto the data beam 108, and projects the data beam 108 to a collimating lens 128, or similar relay optics. The lens 128 in turn transmits the data beam 108 to the holographic memory element 118.

Figure 2:
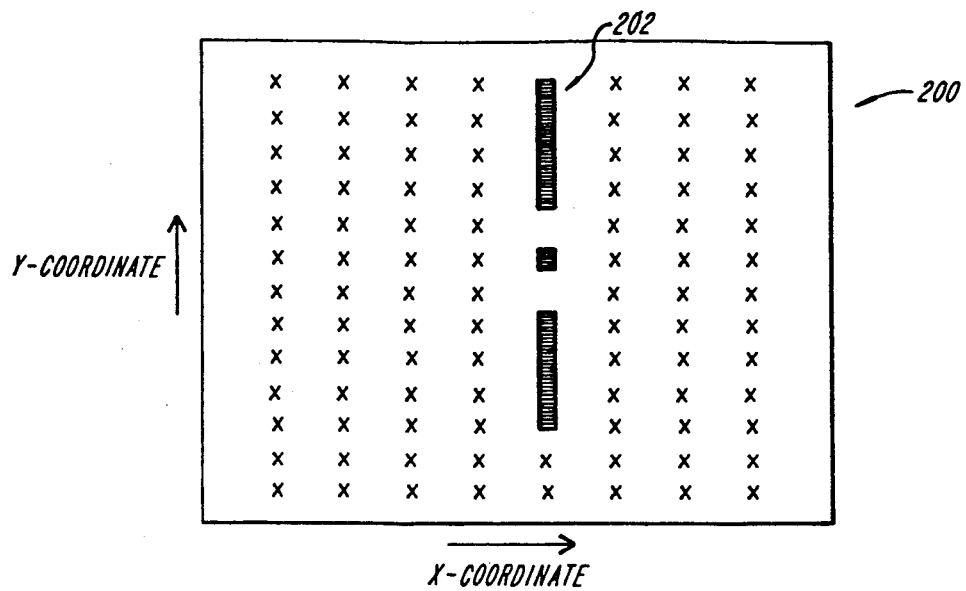
FIG. 2 is a diagrammatic representation of data previously stored in the optical storage medium at specific wavelength and Bragg angle addresses.

FIG. 2 is a diagrammatic representation of one form of data which can be specified for storage by the data specifying plane 126 of FIG. 1. The data bits contained in the array 200 are delineated by x- and a y-coordinates. The black dash-dot-dash pattern 202 in the array 200 represents a particular bit pattern to be stored in the memory element 118.

Once again referring to FIG. 1, the reference beam 106 and the data beam 108 are mutually coherent. During a memory write operation, the lens 128, and the relay optics 114 and 116 ensure that those beams combine in the holographic memory element 118 to record an interference pattern throughout the volume of the holographic memory element 118. The interference pattern recorded is representative of the data array impressed onto the data beam 108. Each interference pattern recorded in the memory 118 is uniquely addressable by specifying the Bragg angle selected at the reference beam deflection element 120, and the wavelength selected at the tunable laser 102.

During a conventional address based memory read operation, in response to externally generated control signals 130, the tunable laser 102 provides a reconstruction beam 106 of a particular wavelength and Bragg angle address. The deflection element 112, in response to the externally generated control signals 120, couples the reconstruction beam 106 to the memory 118 at a particular Bragg angle. The memory element 118, in turn, transmits an output data beam 132 onto an output data plane 134 by way of the lens 136. The output data beam 132 carries impressed on it a data array, of the type shown in FIG. 2, and stored at the particular Bragg angle and wavelength selected at the deflection element 120 and the tunable laser 102, respectively. The data array appears as an array of bright and dark pixels on the output plane 134. The output plane 134 may be, for example, a two-dimensional charge coupled device (CCD) array, which produces electrical signals responsive to the light incident upon its surface. Alternately, the output plane 134 may be a spatial light modulating or amplifying optical computing element. Consequently, an array of data bits of the type shown in FIG. 2, stored holographically at a particular Bragg angle and wavelength address, can be recovered from the memory element 118.

The lenses 128 and 136 act in concert to project onto the output plane 134 a pattern of bright and dark pixels corresponding to the pattern of bright and dark pixels stored on the spatial light modulator included in the data specifying plane 126. Consequently, each bit in the two-dimensional array of the output plane 134 is specified by the same x-coordinate and y-coordinate as the corresponding bit in the data specifying array of FIG. 2. Because the stored data bits are addressable by four independent parameters: Bragg angle, wavelength, x-coordinate, and y-coordinate, the holographic memory element 118 is said to be four-dimensional.

Unlike conventional holographic memory systems, the CAM 100 also includes a broadband light source 138, an address output lens 140, a dispersion device 142, and an address output plane 144. During content addressing operation, the CAM 100 couples a search argument to the memory element 118. The search argument consists of a data string for which the memory element 118 is to be searched. In response to detecting a match to the search argument, the memory element 118 couples, to the address output plane 144, an optical signal, which is indicative of the y-coordinate, wavelength, and Bragg angle memory address of the search argument.

In one embodiment of the invention, the CAM 100 searches all possible Bragg angle and wavelength combinations simultaneously. Consequently, the time required to identify the addresses of any data arrays, which contain the search argument, is independent of the amount of data stored in the holographic memory element 118. Once the address of a data array containing the search argument is identified, the CAM 100 uses that address to execute a conventional read operation to read that data array onto the output data plane 134. The CAM 100 then completes the address of the search argument by searching the data array to determine the x- and y-coordinate location of the search argument. If the CAM 100 identifies more than one data array containing the search argument, each data array is read onto the output data plane 134 and searched to determine the x- and y-coordinate location of the search argument.

Searching all wavelengths simultaneously is accomplished by using the broadband light source 138 during CAM operation, instead of the tunable laser 102. With the read/write shutter 122 open, the reflective surface 104a of the beamsplitter 104 couples the broadband light source 138 to the data specifying plane 126. The data specifying plane 126, in response to the control signals 127, modulates a data array, containing the particular search argument, onto the broadband light beam 108, and couples that beam to the holographic memory element 118 by way of the collimator 128. Thus, the invention couples the search argument to the memory element 118 at all wavelengths simultaneously.

Volume diffraction suppresses the reconstruction of correlation peaks for search patterns which are displaced from the occurrence of the data along the x-coordinates, but not the y-coordinates. Consequently, the system 100 identifies the Bragg angle component of the address of any data arrays containing the search argument by presenting the search argument in every column (i.e., at every x-coordinate) of the search argument data array.

By transmitting the correlation peak, which the memory element couples to the lens 140 in response to the search argument, through the dispersion device 142, the output plane 144 can measure a deflection 146, proportional to the wavelength at which the data array containing the search argument is stored. According to one preferred embodiment, the dispersion device 144 can be a diffraction grating. According to another preferred embodiment, the device 144 can be a prism. Because there is no Bragg selectivity in the y-coordinate direction, the correlation peaks projected onto the output plane 144 are displaced by an amount corresponding to the y-coordinate in the data array at which the search argument is located.

Figure 3A:
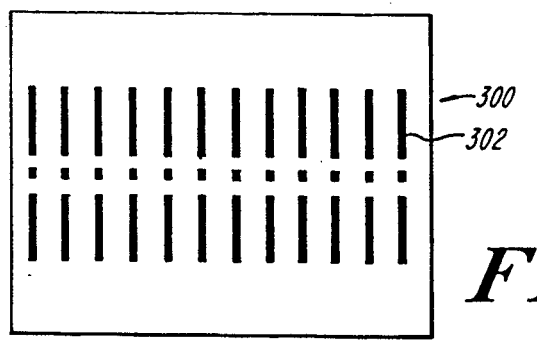
FIGS. 3A and 3B show a data array with the search argument presented at every x-coordinate and the resulting image or search results, respectively.
Figure 3B:
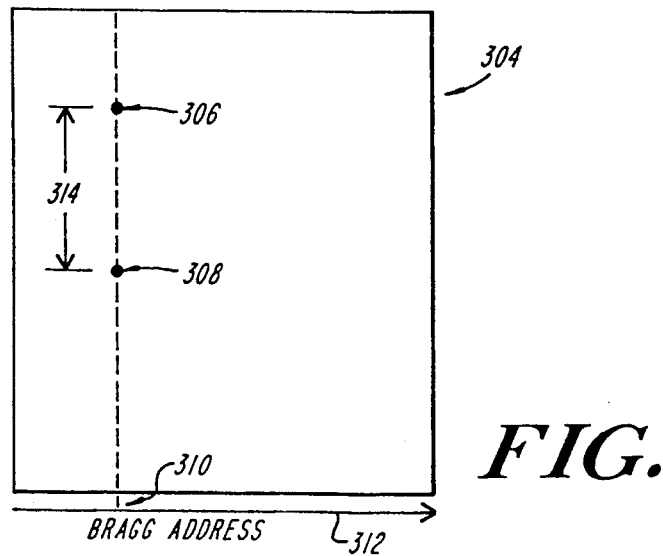

FIG. 3A shows a data array 300 with the search argument 302 presented at every x-coordinate (i.e., Bragg angle address) and at every wavelength address. FIG. 3B shows the point image 304, which the memory element 118 projects onto the address output plane 146, in response to detecting the search argument 302. The position of the projection 310 of the two point images 306 and 308 along the Bragg address axis 312 is indicative of the Bragg angle address at which the detected search argument is stored. The distance 314 between the point images 306 and 308 is indicative of the wavelength address at which the detected search argument is stored.

Figure 4A:
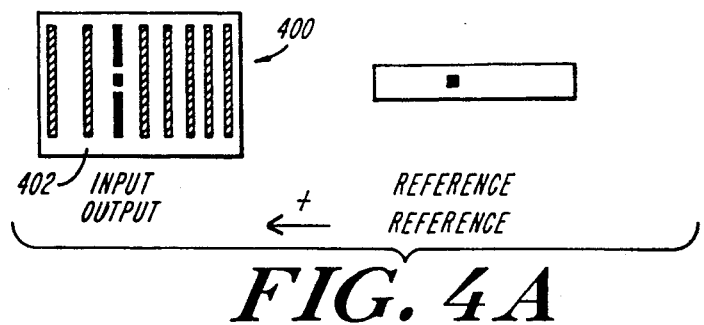
FIGS. 4A–4G show a data array containing a data string to be stored in a holographic memory and also a plurality of search argument arrays paired with their resulting address output plane projections.

FIGS. 4A–4G further illustrate the operation of the CAM 100. The first data array 400 shown in FIG. 4A depicts a data string 402 to be written holographically to the memory element 118. The Bragg angle (i.e., the reference beam deflection angle) at which the data string 402 is to be written is represented by the position of a point image 404, shown at the right, along the Bragg angle address axis 404a.

Figure 4B:
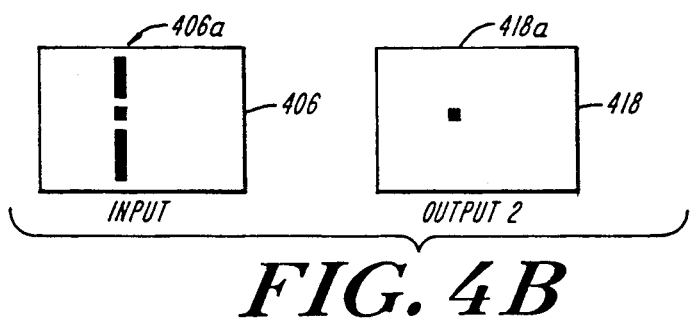

FIGS. 4B–4G depict various search argument data arrays 406–416 and the resulting projections 418–428, coupled to the address output plane 144 by the memory element 118, wherein the memory element 118 contains the data string 402 stored at the Bragg angle address 404. In FIG. 4B, the data array 406 contains a search argument 406a, which matches the data string 402. As can be seen, the search argument 404a is located in the same x-coordinate as the data string 402. As previously explained, the x-coordinate location of the search argument 406a specifies the Bragg angle address of the memory segment to be searched. Since the Bragg angle address of the search argument 406a matches the Bragg angle address of the data string 402, the memory element 118 couples the projection 418 to the address output plane 144. The position of the point image 418a along the Bragg address axis 404a is indicative of the Bragg angle address at which the search argument 406a is found in the memory element 118.

Figure 4C:
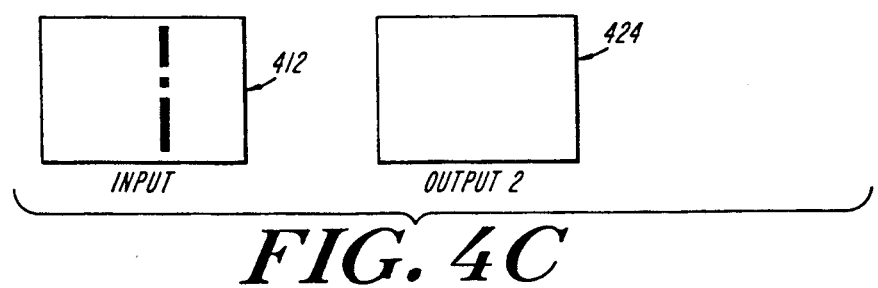
Figure 4D:
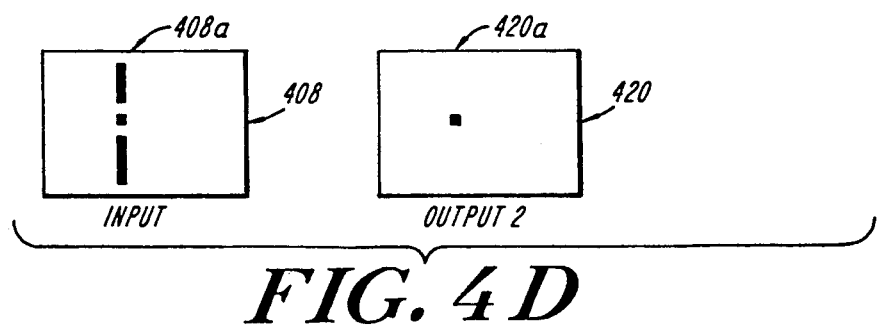
Figure 4E:
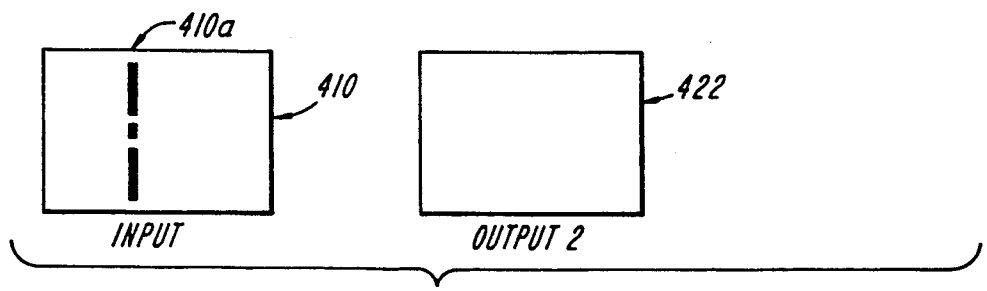

The search argument data array 408 shown in FIG. 4D depicts the same dash-dot-dash search argument 408a. However, the search argument 408a is shifted along the y-coordinate direction. As can be seen from the projection 420 onto the output address plane 144, the position of the point image 420a along the Bragg angle address axis 404a is unaffected by the y-coordinate shift. The y-coordinate shift of the point 420a is equal to the y-coordinate shift of the search string 408a, relative to the position of the search string 406a.

The search argument 410a of the array 410 shown in FIG. 4B is coupled onto a light beam which is devoid of the wavelength address at which the data string 402 was originally stored. Consequently, as shown at 422, no point image is projected onto the address output plane 144. Similarly, the search argument 412a of the array 412 shown in FIG. 4C is projected at a different x-coordinate position and thus, a different Bragg angle address than the data string 402 was stored. As shown at 424, this also results in no match being detected in the memory element 118, and consequently, no point image is coupled onto the address output plane 144.

Figure 4F:
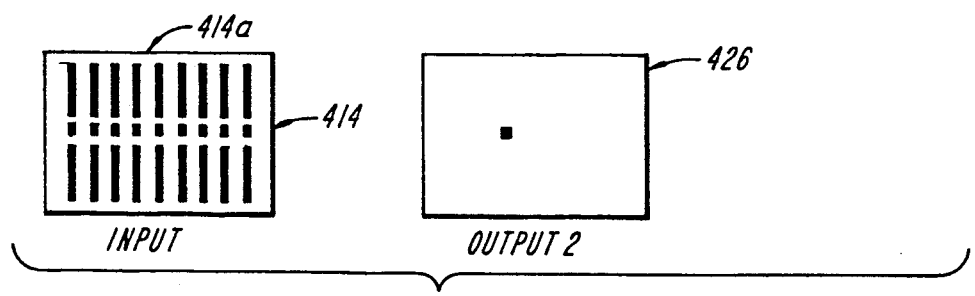

The array 414 is coupled to the memory element 118 using a broadband light source of the type shown in FIG. 1. Additionally, the dash-dot-dash search argument 414a is encoded at every x-coordinate and thus, every Bragg angle address, as shown in FIG. 4F. As can be seen from the projection 426, the point source 426a only appears at the position along the Bragg angle address axis 404a corresponding to the Bragg angle at which the data string 402 was originally stored.

It is well known in the art that light diffracts through a dispersion device. It is also well known that the amount by which a coherent beam of light diffracts when passed through a dispersion device is dependent on the particular wavelength of the beam of light. Consequently, the dispersion device 142 of FIG. 1 provides the mechanism for decoding the wavelength address at which the detected data string is stored in the memory 118.

Figure 4G:
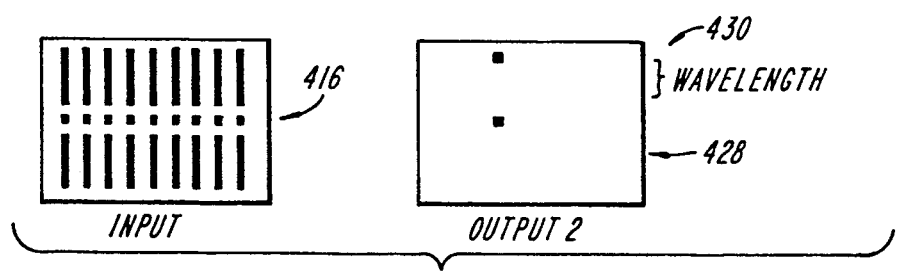

In FIG. 4G, the array 416 shows the dash-dot-dash search argument 416a being coupled onto a broadband light beam at all Bragg angle addresses. The output projection 428 shows the two point images 428a and 428b which result from passing the beam coupled out of the memory element 118 through the grating 142, prior to projecting that beam onto the address output plane 144. As in the prior output projections, the position of the point images along the Bragg angle address axis 404a is decoded to yield the Bragg angle address at which the data string of interest is stored. Additionally, the distance 430 between the two point images is indicative of the wavelength at which the data string is stored.

As one skilled in the art will appreciate, features of the invention are also applicable to neural networks.

Figure 5:
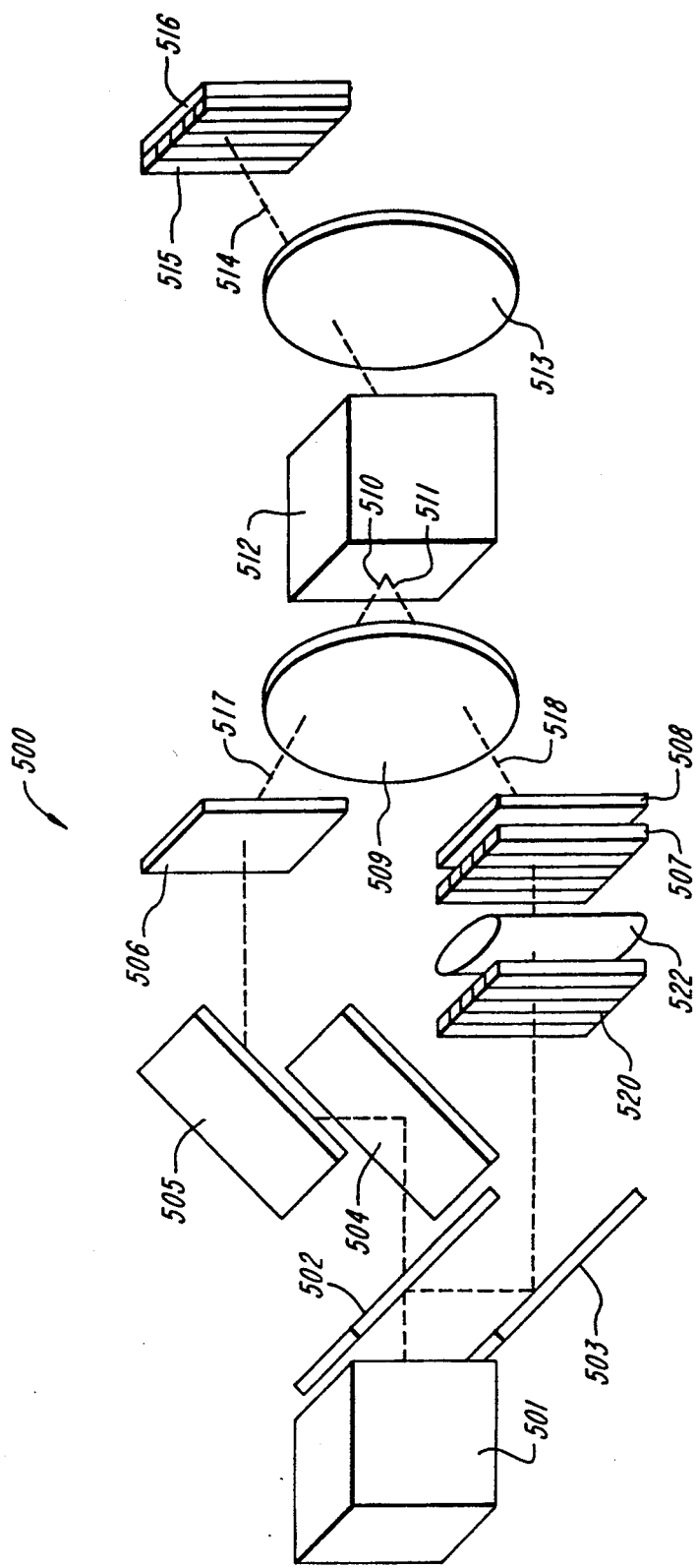
FIG. 5 is a schematic diagram of an optical computing interconnection apparatus utilizing a four-dimensional memory for providing selected interconnections between an input plane and an output plane.

FIG. 5 depicts a four-dimensional interconnection apparatus 500. The interconnection apparatus 500 operates in a manner similar to that of the system illustrated in FIG. 1, utilizing a tunable laser source 501 of coherent radiation for executing optical interconnection operations for the interconnection of designated active sites of one memory element (referred to as the input) with the designated active sites of another memory element (referred to as the output). These operations include optically writing data in the four-dimensional interconnection medium 512 and optically reading data from the medium.

The beam generated by the tunable laser source 501 is divided into two mutually coherent beams of radiation by the beamsplitter 502. The first of these two beams is directed by mirrors 504, 505 through an input connection-specifying plane 506. The input connection-specifying plane 506, as in the case of plane 126 of FIG. 1, includes a conventional spatial light modulator which carries a pattern of data in the form of a two-dimensional array of bright or dark pixels. The pattern carried on the input connection-specifying plane specifies designated active input locations which are to be connected to designated active output locations. This pattern is impressed upon the beam from mirror 505 to generate an input state beam 517.

The second beam derived from the tunable laser by means of the beamsplitter 502 is directed using mirror 503 to an output connection-specifying plane 508 controlled by spatially-variable shutter 507. Output connection-specifying plane 508 also includes a spatial light modulator carrying a pattern of data in the form of a two-dimensional array of bright or dark pixels. This pattern is impressed on the beam from mirror 503 to transmit an output state beam 518 specifying the designated active output locations. The spatially-variable shutter 507 controls whether the "interconnection" (reading) or "learning" (writing) function of the network apparatus 500 will be executed.

During the learning operation, the shutter 507 is opened at a sequence of locations forming a set of vertical stripes, permitting the output state beam 518 to reach the interconnection medium 512 through lens 509, where it is combined with the input state beam 517. The two beams are coherent, and form an interference pattern throughout the volume of the four-dimensional interconnection medium 512. In is used for each vertical stripe to prevent crosstalk between the patterns stored in association with different vertical columns. Each different wavelength is directed to the proper vertical stripe by a grating 520 and a cylindrical lens 522.

Those skilled in the art will understand that this interference pattern, when recorded in the interconnection medium 512 at a specific wavelength, can be used to connect the data activity at a series of input locations to an selectable set of output locations or states arranged in communication with the two-dimensional output plane 516. In particular, the selected interference pattern stored in interconnection medium 512 is transmitted through lens 513, and the resulting output beam 514 is projected onto output plane 516, which may be, for example, a two-dimensional charge couple device (CCD) array.

During the interconnection operation, the shutter 507 is closed, and only the radiation in the input state beam 517 reaches the interconnection medium 512. Those skilled in the art will appreciate that when many different patterns have been stored in the interconnection medium 512, the medium of interest can be used to execute selectable connections between input states and output states by simultaneously illuminating all input states with all the wavelengths used during the learning process. Each input state can be connected to any output state, but only the contributions at the output at the wavelength used to record connections to that state are of interest. A spectral filter array 515, positioned in the path of output beam 514 can be utilized for filtering the beam directed at output plane 516, to select the proper contributions for each state.

With reference again to FIG. 1, an important feature of the CAM 100 is its large data storage capacity, which is achieved by varying the Bragg angle of the reference beam 106 and the wavelength of both the reference beam 106 and the data beam 108. For certain memory elements 118, such as those utilizing Spectral Hole Burning (SHB) materials, approximately 50,000 different wavelengths can be combined with approximately 500 different Bragg angle deflections to record $2.5 \times 10^7$ one megabit data arrays. This yields an addressable storage capacity of approximately $2.5 \times 10^{13}$ bits in a 1 cm cube.

A single molecule has a set of energy levels between which transitions occur when the molecule interacts with a photon of light. If the energy of the photon approximately matches one of the transition energies, the photon can be absorbed by the molecule. If a chemical change to the molecule is induced upon absorption, the absorption levels of the new molecule will not match that of the original molecule. Therefore, the new molecule will not absorb light at the frequency of the first photon. In this way, absorption at a specific frequency can be modulated by exposure to light, permitting the recording of information. By utilizing a wide range of frequencies, an enormous potential storage capacity can be realized.

Figure 6:
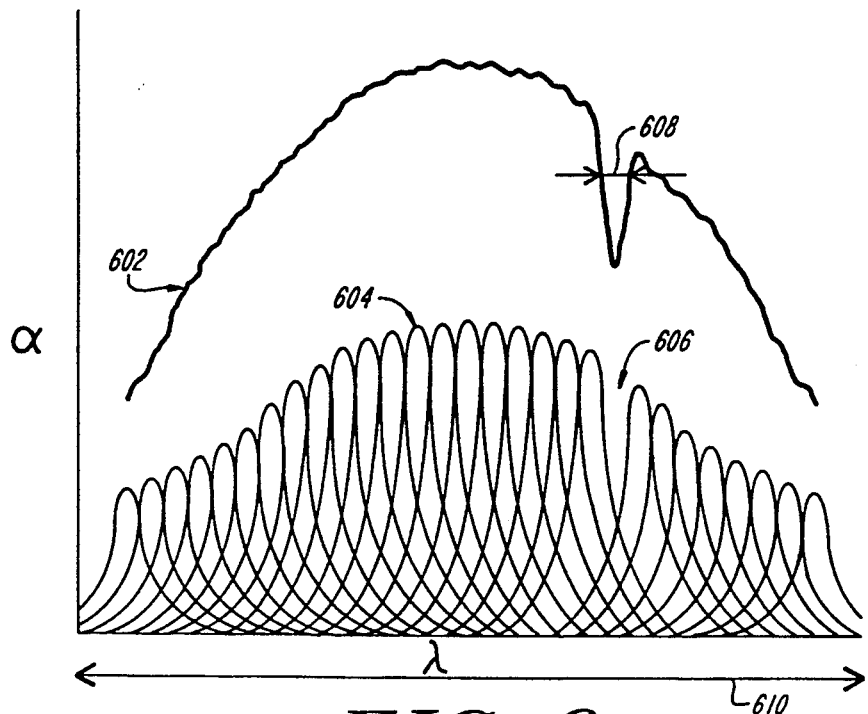
FIG. 6 is a graph of absorption versus wavelength, which illustrates the operation of Spectral Hole Burning (SHB) materials.

FIG. 6 shows a graph of absorption versus wavelength, which illustrates the operation of a SHB material having guest molecules embedded in a solid host matrix, such as a rigid glass or polymer. The graph of FIG. 6 includes the inhomogeneous spectral profile of the overall absorption band for all sites 602, the homogeneous absorption lines 604 for individual sites, the removal of sites at one homogeneous line location 606 by SHB, and a hole 608 caused by SHB. The homogeneous linewidth is the width in frequency space of one independently addressable absorption region. The inhomogeneous linewidth 610 is the superposition of the homogeneous linewidths 604 for the entire ensemble of recording centers embedded in the host medium.

As depicted in FIG. 6, the inhomogeneous absorption band 602 for a SHB material, is composed of a large number of individual molecular populations 604, each of which can be individually addressed by selecting the frequency of the interrogating light beam.

Irradiating the SHB sample at a single frequency causes a photochemical change and effectively burns a hole 608 in the sample over a narrow frequency range. In particular, if the sample is irradiated with a spectrally narrow laser beam, only those molecules that absorb the monochromatic laser light can undergo a photoreaction. The photoproducts, which generally absorb at a different spectral position, create a dip or hole 608 in the irradiation.

The SHB materials can include porphyrin tautomers in a polyethylene matrix, organic dyes in organic polymer host materials, or color centers in glass. Several candidate materials can be easily prepared from commercially available supplies. Some preferred host materials are polyethylene, polystyrene, and polymethylmethacrylate (common plastics).

By utilizing a spectral hole burning medium in conjunction with volume holographic storage, the system depicted in FIG. 1 provides enhanced data storage density. Moreover, holographic storage of data in a volume medium provides much higher storage capacity than that afforded by two-dimensional media, without the processing requirements associated with silicon-based integrated circuit memories. Additionally, SHB allows storage and access to data as a function of frequency, with very high densities of data being possible in frequency space.

Conventional SHB is primarily an absorption phenomenon. The absorption characteristic affects the efficiency with which holograms can be stored, and therefore limits the number of holograms that can be stored at any one wavelength. Absorption holography is most useful to record a small number of holograms at each of a large number of wavelengths. Additionally, holographic memories based on absorption require large amounts of light to be absorbed during memory read operations, causing erasure of the data being read. However, storing fewer holograms at any one wavelength reduces erasure. Moreover, frequency channeling reduces sensitivity to erasure. Also, employing a large number of wavelengths makes up for having fewer holograms stored at any particular wavelength.

Phase holograms are recorded using the real part of the material's refractive index, and diffract light without significant absorption. Consequently, more holograms can be stored at each wavelength. Additionally, phase holograms permit data to be stored in depth within the memory and also permit data to be read without erasure. According to a preferred embodiment of the present invention, the system of FIG. 1 utilizes both phase and absorption holograms.

Figure 7:
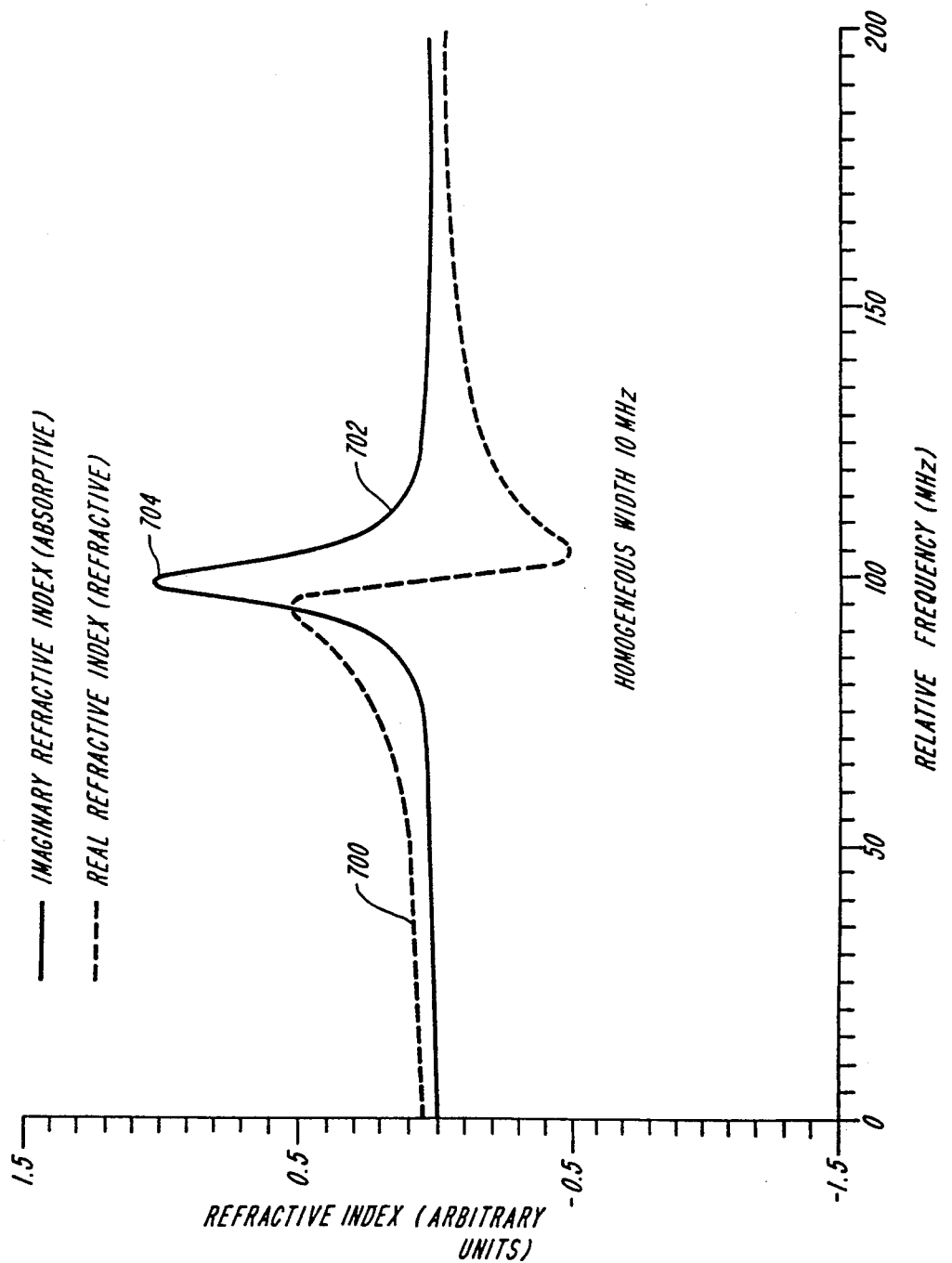
FIG. 7 is a graph illustrating the principle of phase hologram writing with regard to the relationship between real and imaginary refractive indices for a SHB material.

FIG. 7 depicts the relationship between the real 700 and imaginary 702 components of the refractive index for a single damped oscillator. It is well known that The Kramer-Kronig function describes the relationship between the real (refractive) and the imaginary (absorptive) components of the refractive index. The significant feature of this relationship is that the absorption component 702 falls off more rapidly than the refractive component 700. The system spatially modulates the absorption so that optical interrogating elements can read a phase hologram when the reading frequency is off-resonance, and an absorption hologram when on-resonance. If the modulation is large enough and the absorption at the reading frequency low enough, efficiency approaching 100 percent is possible, limited only by the absorption tail.

Figure 8:
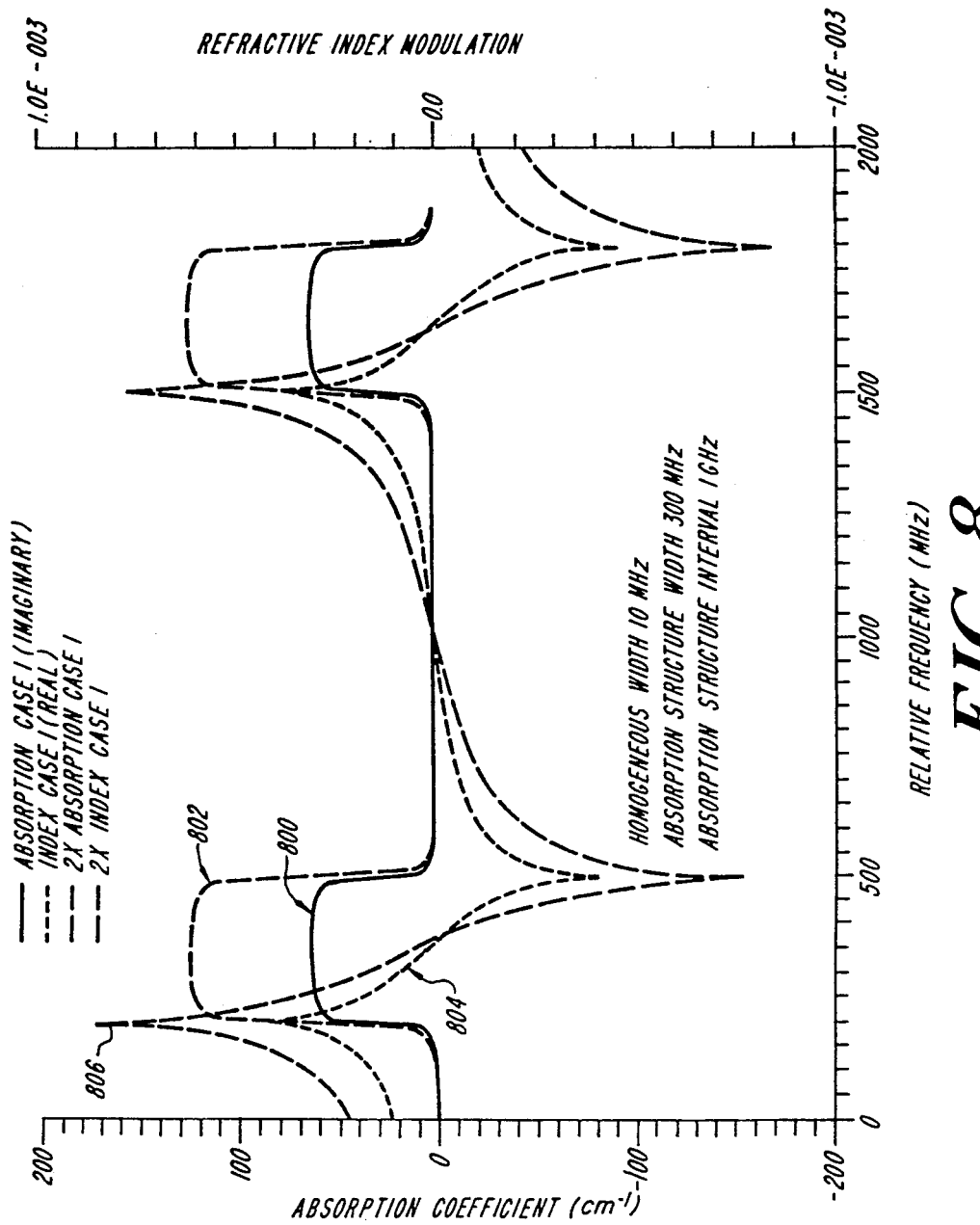
FIG. 8 is a graph depicting the principle of frequency channeling with regard to adjacent absorption structures.

FIG. 8 shows that by broadening the absorption peak 800 using a multiplicity of populations centered over a range of frequencies, the real part 804 of the refractive index can be enhanced near the absorption edge. This effect is logarithmic with frequency, but as shown in FIG. 8, the effect can be large enough to make the peak of the real component 806 larger than the peak of the imaginary component 802. This structure can be replicated many times in frequency space and each can be accessed independently simply by changing illumination wavelength.

The broadening of FIG. 8 can be accomplished by frequency channeling. During frequency channeling a narrow linewidth tunable laser is used to burn or bleach regions of frequency space, referred to as frequency channels, into the memory medium. This bleaching can be generated by the same laser used for data writing operations. The frequency channels allow efficient diffraction in material which is highly doped.

Subsequent to the frequency channeling, phase holograms can be recorded near the absorption edge where the refractive index modulation is appreciable. In these regions, the real component is modulated by the molecular population present in the adjacent absorption structure. The high molecular population within the absorption structure provides a large reservoir of potential storage capacity. The transparent channels effectively provide "access channels" to the vast storage capacity of the SHB material. The refractive index modulation present within the bleached channels is adequate to allow the storage of many high efficiency phase holograms, and many of these channels can be contained within the frequency range of the SHB material.

These channels thus enable efficient reading and writing of data, while allowing for high molecular densities in the adjacent absorption structures where the data is actually stored.

The burning of channels effectively constitutes a processing of the material prior to, or during, storage operations. Those skilled in the art will appreciate that this processing can be accomplished in the illustrated memory unit.

The frequency channeling method is also compatible with further augmentation of data storage by Stark broadening.

Because the real part of the index modulation falls off quite slowly, there is the potential for cross-talk between absorption structures. This can be reduced by allowing space between structures. The cross-talk effect can be seen as an asymmetry in the index modulation in FIG. 7. Because two absorption structures are present in the simulation shown therein, one can see that the positive lobe of the real index is greater on the left absorption structure, than the positive lobe on the right structure. The solution to this problem is to provide frequency space between absorption structures. The space required is related to the cross-talk limits of the system and the homogeneous linewidth.

Large index modulations are possible, which can provide a significant dynamic range to the medium —i.e., a number of holograms can be superimposed at the same wavelength and Bragg angle address. FIG. 8 shows two adjacent absorption structures illustrating the modulation of the resultant modulation of the refractive index. Such a structure is possible with porphyrin in polyethylene at 1 degree Kelvin. The frequency coordinates of this structure will essentially scale quite linearly with temperature. For the case shown in FIG. 8, absorption is reduced by a factor of 200 from the absorption peak at a point 200 MHz from the absorption edge. Thus, for an absorption peak of 120 cm$^{-1}$, the system can easily read and write at a wavelength where the absorption is only 0.6 cm$^{-1}$. This permits relatively high transmittance, of approximately 56 percent, for laser reading and writing. Higher efficiency can be attained where required. The magnitude of the real part of the refractive index modulation at this wavelength is $2 \times 10^{-4}$.

Analysis has demonstrated that in a medium of 1 centimeter thickness, at least 7 holograms can be stored at 56 percent efficiency, or 200 holograms at 0.1 percent efficiency. By reducing the peak absorption by a factor of 7 the system can store a single hologram at each wavelength at 91 percent efficiency.

Additional storage capacity can be realized by exploiting a principle known as the Stark effect. The Stark effect involves the interaction of the permanent electric dipole moment and the polarizability of an electron state with an electric field, which leads to energy level shifts that depend on the field strength and the orientation of the molecule with respect to the electric field. In a polymer matrix, the guest molecules are randomly oriented. The transition energy between two electron states will show a small shift under the influence of the electric field. Due to the random orientation of the guest molecules, the superposition of the shifted transitions results in a symmetrically broadened, shallower hole profile. By application of sufficient field, the spectral hole profile can be completely rearranged resulting in a smooth profile suitable for further recording of data. This process is completely reversible, and the initially recorded data can be observed again if the initial conditions are restored.

Spectral lines can thus be broadened under the influence of a static electric field. For a single molecular population—one which has a homogeneous linewidth with no applied field—the absorption peak is broadened. However, this is not a broadening of the homogeneous width, but is a broadening of the population. Adjacent populations in frequency space can then overlap and be rearranged by the electric field.

Figure 9:
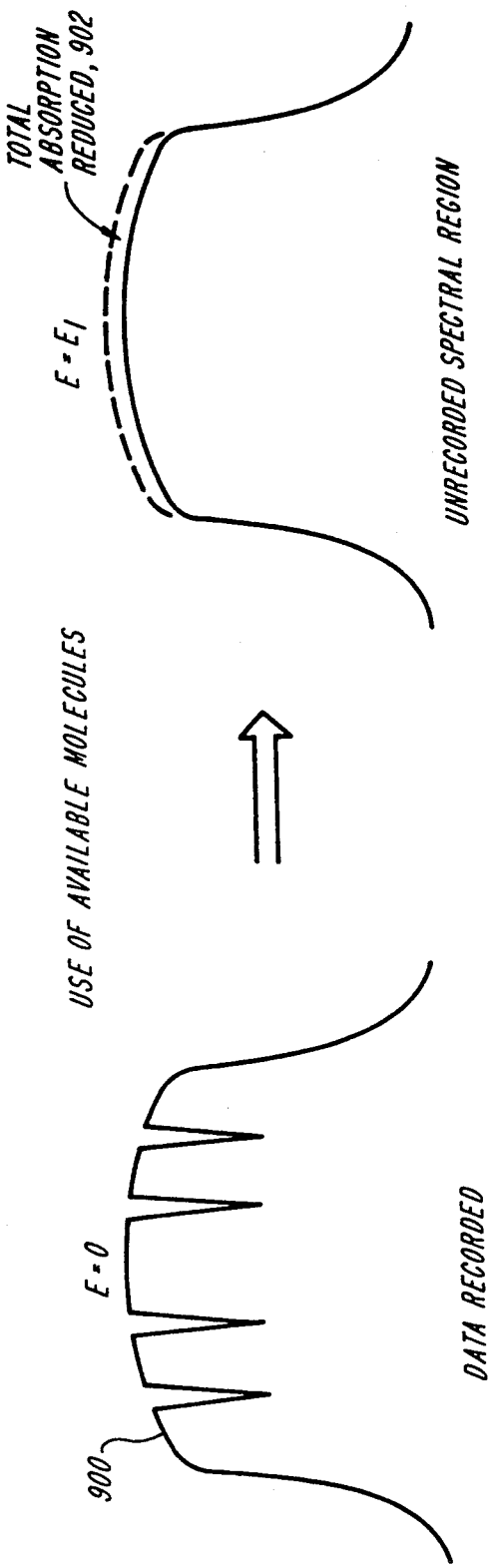
FIG. 9 is a graphical representation of the Stark effect.

FIG. 9 illustrates the Stark effect. FIG. 9 shows an absorption curve 900 for a particular spectral region with data recorded at an electric field of $E=0$, and the absorption curve 902 for the same spectral region, resulting from changing the electric field from $E=0$ to $E=E_1$. As can be seen, at each electric field a separate spectral hole can be created within the limits of the homogeneous spectral width. The number of discrete electric fields that can be applied is limited only by the molecular dipole moments, the homogeneous linewidth, and the breakdown limits of the material. The recording of data reduces the total molecular population available. However, if a fraction of the population used at each electric field is small, the dynamic range as a function of electric field can be large. More than one hundred spectral holes can be made at a single frequency, which are independently selectable by electric field. Thus, this is not simply a redundancy in the concept of the spectral hole burning, but is an additional parametric control that allows greater access to more memory.

Figure 10:
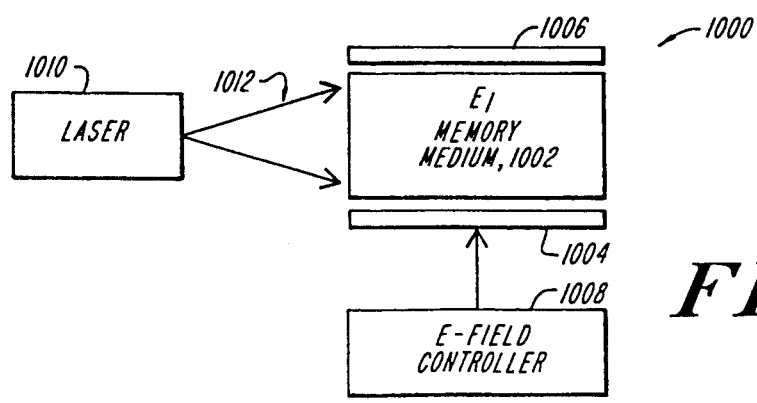
FIG. 10 is a schematic block diagram depicting an embodiment of the invention which utilizes an applied electric field to rearrange the spectral hole profile of a holographic memory element.

FIG. 10 shows a schematic block diagram for a system 1000 which utilizes the Stark effect. Electrical contact plates 1004 and 1006 are placed on opposite sides of a memory medium 1002. A selected voltage is applied to the contacts 1004 and 1006 by the controller 1008, thereby generating a selected electric field across the memory medium 1002.

As indicated in FIG. 10, the Stark effect enhancement can be utilized in conjunction with the above described frequency channels used for hologram reading and writing. The only requirement is that the laser source 1010 must burn the channels 1012 in at each applied electric field strength. This will tend to reduce the total available molecular population to be modulated, but this reduction is far outweighed by the addition of the additional parameter of addressability which the Stark effect provides.

Figure 11:
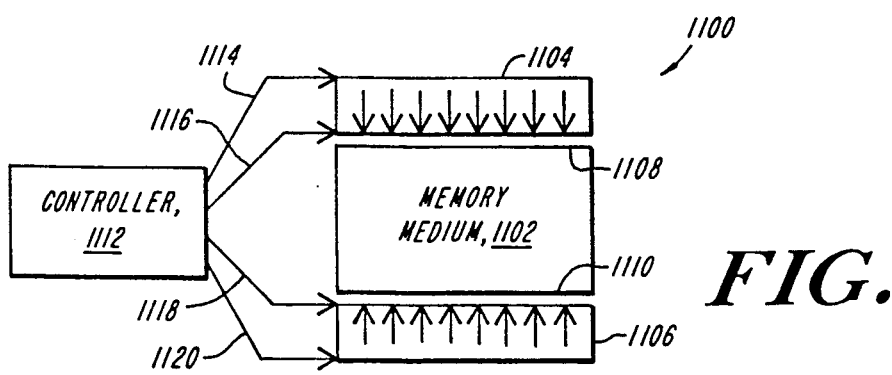
FIG. 11 is a schematic block diagram depicting an embodiment of the invention which utilizes piezoelectric elements to rearrange the spectral hole profile of a holographic memory element.

FIG. 11 depicts an approach related to the Stark effect; a system 1100 for broadening and rearranging the spectral hole profile of a memory element 1102 by inducing physical forces. It is known that physical stress applied to a SHB material modifies the local environment of each recording location, resulting in a modification of the absorption wavelength characteristic. In the system 1100, the piezoelectric elements 1104 and 1106 are placed in contact with opposing sides 1108 and 1110 of the memory element 1102. The controller 1112 generates the excitation signals 1114-1120 and couples those signals to the elements 1104 and 1106. In response to those excitation signals, the elements 1104 and 1106 apply a physical stress to the memory element 1102, generating an internal electric field which in turn initiates Stark effect broadening. By controlling the magnitude of the applied physical stress, the system can address holographic images recorded at different stress field magnitudes.

Total storage capacity of the illustrated can be calculated. Assuming a spatial light modulator composed of 1100 by 1100 elements, a single hologram can contain as many as $10^6$ bits. For a material having an inhomogeneous width of 10 tetrahertz (10 nanometers) and a homogeneous width of 10 megahertz, the system can create at least one absorption structure every 1 gigahertz, so that $10^4$ frequencies can be used for storage. Several molecular species could be used simultaneously in the same material to provide storage. A reasonable estimate would be five species. Accordingly, there can be as many as $5 \times 10^4$ frequencies available for storage of data. By varying the reference beam angle, as many as 500 holograms can be stored at each wavelength. Employing the Stark effect or stress-induced broadening can provide as many as 100 independent field strengths at each frequency, giving $2.5 \times 10^{13}$ bits per cubic centimeter.

Where system requirements permit a trade-off in hologram efficiency for data storage, holograms having approximately 0.1 percent efficiency can be employed. This would permit 200 holograms, each requiring a reference beam incident at a separate angle. In turn, the 200 hologram capacity would provide a storage capacity of $10^{13}$ bits per cubic centimeter.

System capacity is likely to be limited only by the availability of molecules for storage. The extra degrees of freedom provided by the invention in frequency space and in electric field and stress field space may allow such a system to become technically realizable.

One preferred embodiment of the present invention utilizes a SHB material of the type discussed above.

As described above, large storage capacity content addressability and applicability to neural networks make holographic memories an attractive alternative to conventional memory systems However, even with the inherently strong signal to noise ratio provided by a holographic memory, error correction techniques are nevertheless needed to provide the performance required for a computer memory system The error correction techniques employed in the present invention utilize phase encoding to provide significant advantages over prior art systems At the outset it is important to distinguish between error correction codes (ECC) and error correcting modulation (ECM). The difference between ECC and ECM is that ECC reduces the bit error rate (BER) by coding groups of bits, with additional (or redundant) bits used to provide error correction and detection. Alternately, ECM corrects errors at their source by using signal patterns with characteristics that are well-suited to the recording medium. Magnetic recording utilizes both ECC and ECM to achieve higher and higher recording densities. In the past, the limiting factor on the use of ECC was not the overhead of the extra bits required, but instead the cost of the coding and decoding hardware. As the cost of the coding and decoding hardware drops, magnetic storage systems are tending to operate with higher raw BERs and consequently, more ECC to achieve higher density storage devices. A rule of thumb for ECC performance is that an improvement of seven orders of magnitude can be achieved with an overhead of approximately 30%.

Holographic optical recording media are subject to many of the same degradations as magnetic and optical disk recording media. For example, a non-uniform spatial frequency response in the holographic system could result in degradations similar to those caused by a non-uniform electronic or transducer-induced frequency response in a disk system. In a holographic system, drop-outs, drop-ins, or variable signal strength can be caused by media imperfections, by vignetting, or by dead detector array elements The type of error correction employed should be related to the types of errors that are most likely to occur in a given system.

The effects of variable signal strength can be eliminated to a large degree using ECM in the form of slope encoding. According to slope encoding, a positive slope is defined as either a logical one or a logical zero and a negative slope is defined as the other. Using a CCD detector array, like those shown at 134 and 144 in FIG. 1, each data bit is encoded as two pixels. For example, a logical one can be encoded as an on-pixel and off-pixel ordered pair, whereas a logical zero can be encoded as an off-pixel and on-pixel ordered pair. A disadvantage to this approach is that it results in a 100% overhead. However, the reduction in error rate that can be achieved when this scheme is used in conjunction with ECC exceeds the reduction that can be obtained using ECC alone.

Slope encoding is particularly advantageous with respect to holographic memory systems. This results because the transmission of every data bit is equal to 50% (i.e. one and only one on-pixel). This known, fixed value enables the system designer to choose a reference beam of the proper intensity to prevent non-linear data recording, independent of the particular data pattern being recorded Moreover, even if the average data beam intensity fluctuates, the relationship between the two pixels does not change. Consequently, a variation in average data beam intensity does not result in a loss of data. Slope encoding is also particularly advantageous for CAM systems because the on-pixels associated with every bit allow the use of phase modulation, a technique that tends to sharpen autocorrelation peaks and reduce the height of unwanted cross-correlation peaks. For similar reasons, slope encoding and phase modulation are also applicable to holographic systems employed to realize neural networks.

Figure 12A:
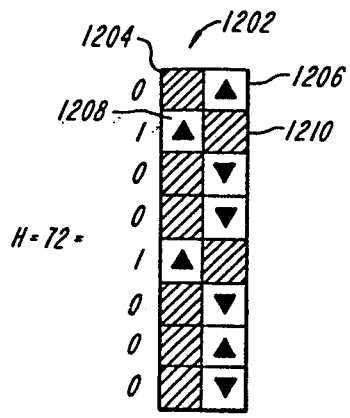
FIGS. 12A–12F are graphical illustrations of the operation of slope encoding.

FIGS. 12A-12F illustrate the operation of slope encoding, both with and without the use of phase modulation. In FIG. 12A an ASCII "H" is shown recorded in a holographic memory. As shown, the ASCII code for an "H" is a decimal 72 which is equal to a binary 0100 1000. The two-pixel slope encoding for each binary bit is shown at 1202. Each logical zero is encoded as an off-pixel and on-pixel ordered pair, represented by a dark block 1204 paired with a light block 1206. Alternatively, each logical one is encoded as an on-pixel and an off-pixel ordered pair, represented by a light block 1208 paired with a dark block 1210.

Figure 12B:
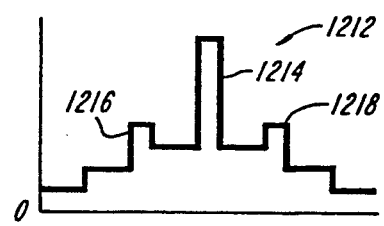
Figure 12C:
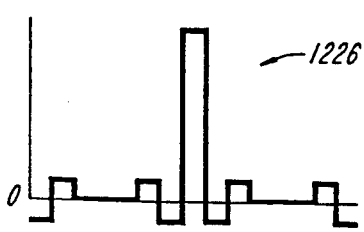

The graph 1212 in FIG. 12B represents the result of correlating an ASCII "H" with itself. As is well known in the art, a correlation operation involves repetitively shifting the two operands being correlated, multiplying the two operands and then adding the two operands. The resulting central peak 1214 is indicative of a strong correlation (i.e. likelihood of a match) between the two operands. However, the sidelobes 1216 and 1218 make it more difficult to readily distinguish between two operands which are similar but do not in fact match. This problem is apparent with respect to operands such as an ASCII "H" and an ASCII "X".

Figure 12D:
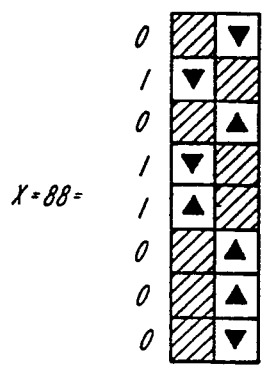

As can be seen in FIG. 12D, the ASCII code for an "X" is a decimal 88 which is equal to a binary 0101 1000. This differs by only one bit from the ASCII representation for an "H". Consequently, it is unclear from the autocorrelation of the "H" and the "X", as depicted in the graph 1220 of FIG. 12E, whether the two operands match.

Figure 12E:
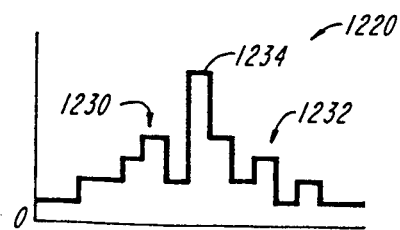
Figure 12F:
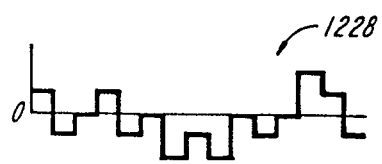

According to a preferred embodiment of the invention, phase modulation is combined with the slope encoding. A zero phase is represented by an up arrow 1222, and a PI (180 degree) phase is represented by a down arrow 1224. Essentially, the phase modulation reverses the phase of the light in some of the pixels, thus causing the sidelobes to cancel out and also causing the central peak to be more accentuated. As can be seen in graph 1226 of FIG. 12C, with phase modulation, the sidelobes 1216 and 1218 are virtually eliminated. Additionally, in the case of the "X" and "H" correlation as shown in FIG. 12F, the spurious central peak 1234 of FIG. 12E is also virtually eliminated.

According to one embodiment of the invention, the phase state for each bit is chosen in a random fashion However, once the phase states associated with a particular character are chosen those phase states are invariant. For example, the ASCII "H" of FIG. 12A is always stored as a binary 0100 1000 with the phase states shown. In an alternate embodiment, the phase states are initially chosen randomly and then modified based on autocorrelation test results to realize the highest possible central peaks with the lowest possible sidelobes.

In database operations, a search is often performed for a string by using an "all inclusive" or "wild card" condition in which any character is acceptable. This capability can be provided by specifying a defined character. For example, a system might provide for searching for all character strings beginning with "abc" by specifying a search argument of "abc*." In that case, the * is the wild card. According to one embodiment of the invention, the defined all inclusive or wild card character is composed of two "off" pixels; a combination which is not used to represent either a zero or one bit. This pattern has the advantage of introducing no light into the system, and thus it will neither add to nor subtract from any correlation peaks indicating the presence of the search string. Since upper and lower case ASCII characters differ in only one bit position, a wild card or all inclusive bit is extremely useful for performing case independent searches. When only a single pixel is used to represent each bit, three different levels of pixel values are distinguishable, requiring a much higher signal to noise ratio for reliable operation. Thus, slope coding provides an important practical advantage for searching content addressable memories.

Most tunable lasers can produce beams of very narrow wavelength content, and are able to shift the center wavelength by a controllable amount, however, the determination of the exact value of the wavelength requires a separate instrument, commonly called a wavemeter. Wavemeters are often as complex as the laser itself, and thus will add considerable cost to a memory or neural network system. Slope and phase coding allow the creation of a unique pattern which can be used to mark each page of memory. This unique pattern could consist of a sequence of two "on" pixels with a known phase code on each pixel. This pattern is "illegal" in the sense that it could never be produced by any bit pattern. By placing this pattern in the same part of each page of data, and presenting the pattern at every Bragg angle, the address finder can be used to determine the page of data recorded in the memory at the illumination wavelength. Once this page address is known, any page in the memory can be addressed by shifting the wavelength a known amount. Thus, the simultaneous use of slope and phase encoding provides a significant simplification of the tunable laser, and thus, the entire memory system.

An alternate approach for identifying the laser wavelength involves including, on each recorded page, an identical phase encoded pattern. To determine the laser wavelength, the system presents this pattern to the storage medium at the single unknown laser wavelength. In response, the storage medium couples, to the output plane 144 of FIG. 1, a point image. The position of that point image, as previously discussed, is indicative of the Bragg angle and wavelength address of the phase encoded pattern. Thus, from the position of the point image, the unknown laser wavelength can be decoded.

The combination of slope encoding and phase coding requires simultaneous amplitude and phase modulation. This dual mode modulation can be achieved with various types of reflective and transmissive spatial light modulators, such as deformable mirror devices, liquid crystal devices, and ferro-electric devices.

FIGS. 13A-13C show how a liquid crystal spatial light modulator with gray scale capability can be modified to produce dark pixels, or light pixels with a zero or $\pi$ phase shift. It is known that by applying a voltage across a liquid crystal, the amount by which the liquid crystal rotates the polarity or the phase of light transmitted through or reflected from the crystal, as shown schematically in FIG. 13A, can by controlled. For example, in common wrist watch displays, illustrated in FIG. 13B at 1300, the control voltage is switched between two levels V1 and V2, yielding two different angles of rotation. The watch display includes a polarizer which allows the light reflected from the display at one rotation (e.g. V1) to pass, but filters out the light at the other rotation (e.g. V2). When the light passes the polarizer, the pixel appears light. When the polarizer blocks the light, the pixel appears dark. Consequently, as the control voltage switches back and forth, the pixel appears to switch on and off.

According to one embodiment of the present invention, depicted at 1302 in FIG. 13C, a polarizer is selected such that when the reflected light is not rotated at all, a component passes through the polarizer with zero phase shift 1304. As shown at 1306, when the reflected light is rotated through some predefined angle, it passes through the polarizer, but is phase shifted 180 degrees. If the reflected light is rotated halfway through the predefined angle, it does not pass through the polarizer, and the pixel appears to be dark. This situation is depicted at 1308.

In this way the invention attains the objectives set forth above. In particular, a preferred embodiment of the invention provides a CAM having an improved storage density and also having error correcting features which render the invention a viable alternative to conventional memory systems.

Changes may be made in the above construction and in the foregoing sequences of operation without departing from the scope of the invention. For example, various methods can be used for wavelength selection of the reading and writing lasers. Several methods for steering the reading and writing lasers in two orthogonal angular directions can be employed, and holographic or reflective optics can be used in place of the refractive optical elements illustrated in the figures. Additionally, data storage can also be achieved on the basis of the Stark effect alone, using a fixed frequency laser. For example, data can be recorded at selected electric field strengths and read out by sweeping the electric field.

It is accordingly intended that all matter contained in the above description or shown in the accompanying drawings be interpreted as illustrative rather than in a limiting sense.

It is also intended that the following claims are intended to cover all of the generic and specific features of the invention as described herein, and all statements of the scope of the said to fall therebetween.

Having described the invention, what is claimed as new and secured by Letters patent is:

1. A content addressable memory system for storage and retrieval of digital data, the system comprising
optical storage means including a three or more dimensional holographic storage medium for storing a plurality of holographic images representative of data fields, input means for transmitting information into said holographic storage medium and output means for retrieving information from said holographic storage medium, wherein said holographic storage medium comprises a spectral hole burning material including absorption regions addressed by an interrogating beam of light specifying an address field that includes a wavelength address indicating a wavelength at which a particular data field in said holographic storage medium is stored and a Bragg angle address indicating a Bragg angle at which said particular data field in said holographic storage medium is stored, and
content addressable interrogation means, cooperative with said input means and said output means, operative in at least a first mode, for generating a search argument including a first target data field to be simultaneously searched over at least a segment of said optical storage means containing more than one of said data fields; for presenting said search argument into said holographic storage medium; and for extracting from said output means a set of address fields associated with data fields in said holographic storage medium that match said target data field of said search argument.

2. A system according to claim 1 in which said interrogation means further includes broadband light source means optically coupled to said input means and operative in said first mode for generating a broadband light beam including a plurality of wavelength addresses.

3. A system according to claim 2 in which said interrogation means further includes data specifying means coupled between said broadband light source means and said input means and operative in said first mode for modulating said first target data field onto said broadband light beam at a plurality of Bragg angle addresses.

4. A system according to claim 3 in which said data specifying means includes spatial light modulator means for modulating said first target data field onto said broadband light beam, as an array of essentially bright and essentially dark pixels.

5. A system according to claim 4 in which said spatial light modulator means includes means for encoding said first target data field as an array of ordered pairs of essentially bright and essentially dark pixels, wherein said data specifying means encodes a data bit having a first logical stage as an ordered pair consisting of an essentially dark pixel and an essentially bright pixel and encodes a data bit having a second logical state as an ordered pair consisting of an essentially bright pixel and an essentially dark pixel, and for impressing said array onto said broadband light beam.

6. A system according to claim 5 in which said array includes a plurality of rows and columns and said spatial light modulator means includes means for specifying particular Bragg angle addresses by which of said columns contains said first target data field.

7. A system according to claim 5 in which said spatial light modulator means includes means for specifying an all inclusive condition within said first target data field, said all-inclusive condition being specified as an ordered pair consisting of a first essentially dark pixel and a second essentially dark pixel.

8. A system according to claim 4 in which said spatial light modulator means includes phase encoding means for impressing said first target data field encoded as said array of ordered pairs of essentially bright and essentially dark pixels onto said broadband light beam by selectively rotating the polarity of said broadband light beam.

9. A system according to aim 8 in which said spatial light modulator means includes a two-dimensional array of liquid crystal spatial light modulator elements, wherein each of said modulator elements corresponds to said essentially bright or said essentially dark pixel to be impressed onto said broadband light beam, and each of said modulator elements includes means, responsive to a voltage control signal, for impressing said essentially bright pixel onto said broadband light beam of any of, rotating said broadband light beam by a first polarization and passing said broadband light through said modulator element, and rotating said broadband light beam by a second polarization and passing said broadband light through said modulator element, and each of said modulator elements further includes means, responsive to said voltage control signal, for impressing said essentially dark pixel onto said broadband light beam by blocking said broadband light beam from passing through said modulator element.

10. A system according to claim 9 in which said system includes polarity control means, coupled to said liquid crystal spatial light modulator elements for selecting at each modulator element any of said first polarization and said second polarization to be impressed onto said broadband beam of light.

11. A system according to claim 10 in which said system includes correlation means for correlating data, stored in said holographic medium and having a particular polarization, with test data and for signaling said polarity control means to update said polarization of said data stored in said holographic medium in response to said correlation.

12. A system according to claim 3 in which said interrogation means further includes an output plane means including a light sensitive surface means optically coupled to said output means for producing electrical output signals in response to the location at which one or more light beams are incident upon said light sensitive surface.

13. A system according to claim 12 in which said interrogation means operates to generate and transmit at least one light beam onto said light sensitive surface, the position at which each of said light beams are incident upon said light sensitive surface means being indicative of a Bragg angle address in said holographic storage medium at which said first target data field is stored.

14. A system according to claim 13 in which said output means further includes dispersion means coupled between said beam generation means and said light sensitive surface means for dispersing said light beam, the degree of dispersion being indicative of a wavelength address in said optical storage at which said first target data field is stored.

15. A system according to claim 12 in which said light sensitive surface means includes an array of light sensitive pixels, and means for generating an electrical output signal, wherein said output signal is indicative of a particular combination of said light sensitive pixels being exposed to light.

16. A system according to claim 15 in which said interrogation means includes data reading means for reading from said storage medium said second target data fields previously written to said storage medium, wherein said output means includes means for coupling each of said essentially bright and essentially dark pixels included in said second target data fields to a corresponding light sensitive pixel on said light sensitive surface means.

17. A system according to claim 1 in which said holographic storage medium includes means for storing phase holographic images representative of digital data fields, said phase holographic images being stored in index modulation regions near spectral hole absorption edges.

18. A system according to claim 17 in which said system further includes means for applying an external electric field of specified voltage to said holographic storage medium to induce Stark effect broadening of said spectral hole burning material, so that at a given wavelength of interrogating light, a different holographic image being stored for each of a plurality of voltages.

19. A system according to claim 18 in which said system further includes Stark effect control means for specifying said voltage of the applied electric field.

20. A system according to claim 17 in which said system further includes means for applying a physical stress of specified magnitude to said holographic storage medium to induce broadening of said spectral hole burning material, so that at a given wavelength of interrogating light, a different holographic image can be stored for each of a plurality of stress field magnitudes.

21. A system according to claim 20 in which said system further includes physical stress control means for specifying said magnitude of said physical stress field.

22. A system according to claim 20 in which said means for applying said physical stress further includes at least one piezoelectric element in contact with at least one surface of said holographic storage medium, said piezoelectric element being responsive to an electrical control signal to apply a specified physical stress field to said storage medium.

23. A system according to claim 1 in which said interrogation means further includes neural network means for generating said search argument including said target data field representative of an interconnection encoding between a designated active storage location of a first memory element and a designated active storage location of a second memory element.

24. A system according to claim 1 in which said interrogation means further includes data writing means, operative in a second mode, for writing data fields to said storage medium, and said writing means includes,
variable wavelength laser means, operative in said second mode, and coupled to said input means over a first optical path by way of said data specifying means for generating a writing beam of coherent light at a specified wavelength address, and
deflecting means operative in said second mode, and coupled to said variable wavelength laser means for coupling said writing beam of light over a second optical path at a specified Bragg angle address to said storage medium, and
spatial light modulator means includes an array of data bits to be written into said storage medium, and means operative in said second mode for encoding each of said data fields as an array of ordered pairs of essentially bright and essentially dark pixels, wherein said data bits having a first logical state are encoded as an ordered pair consisting of an essentially dark pixel and an essentially bright pixel, and said data bits having a second logical state are encoded as an ordered pair consisting of an essentially bright pixel and an essentially dark pixel, and means or impressing said array of ordered pairs onto said writing beam coupled to said input means over said first optical path.

25. A system according to claim 24 in which said spatial light modulator means includes phase encoding means for impressing said second target data fields encoded as said array of ordered pairs of essentially bright and essentially dark pixels onto said coherent beam of light by selectively rotating the polarity of said writing beam of coherent light.

26. A system according to claim 25 in which said spatial light modulator means includes a two-dimensional array of liquid crystal spatial light modulator elements, wherein each of said modulator elements corresponds to said essentially bright or said essentially dark pixel to be impressed onto said coherent beam of light.

27. A system according to claim 26 in which each of said modulator elements includes polarization means, responsive to a voltage control signal, for impressing said essentially bright and essential dark pixels onto said coherent beam of light by rotating said coherent beam of light.

28. A system according to claim 27 in which said polarization means includes means, responsive to said voltage control signal, for impressing said essentially bright pixel onto said coherent beam of light by rotating said coherent beam of light by a first polarization and passing said coherent beam of light through said modulator element.

29. A system according to claim 28 in which said polarization means includes means, responsive to said voltage control signal, for impressing said essentially bright pixel onto said beam of coherent light by rotating said coherent beam of light by a second polarization and passing said coherent beam of light through said modulator element.

30. A system according to claim 29 in which said polarization means includes means, responsive to said voltage control signal, for impressing said essentially dark pixel onto said coherent beam of light by blocking said coherent beam of light from passing through said modulator element.

31. A system according to claim 26 in which said data writing means includes page address labeling means for writing to said storage medium, with each of said array of data bits, said second target data field having a wavelength address label stored in a specified portion of said array of data bits, and wherein said spatial light modulator means includes means for encoding at least one bit included in said address label as an ordered pair consisting of a first essentially bright pixel having a first specified polarization and a second essentially bright pixel having a second specified polarization.

32. A system according to claim 31 in which said system includes wavelength detection means for determining the wavelength of said coherent beam of light by reading that wavelength address label stored at a wavelength address, in said storage medium, corresponding to the wavelength of said coherent beam of light.

33. A system according to claim 32 in which all of said wavelength address labels are identical and said system includes means for determining the wavelength of said coherent beam of light by applying to said storage means said search argument which matches said address label and by detecting the position of a resulting point image on said output plane.

34. A system according to claim 26 in which said system includes polarity control means, coupled to said liquid crystal spatial light modulator elements for selecting at each modulator element any of a first polarization and a second polarization to be impressed onto said coherent beam of light.

35. A system according to claim 34 in which said system includes correlation means for correlating data, stored in said holographic medium and having a particular polarization, with test data and for signaling said polarity control means to update said polarization of said data stored in said holographic medium in response to said correlation.

36. An optical data storage system for writing and reading data out of and into a storage medium, said system comprising,
optical storage means including a multi-dimensional holographic storage medium for storing a plurality of holographic images representative of digital data fields,
variable wavelength laser means coupled to said storage medium for generating a writing beam of coherent at a specified wavelength address, and
deflecting means coupled between said variable wavelength laser means and said storage medium or deflecting said writing beam of light over a first optical path to said storage medium at a specified Bragg angle address, ad
data specifying means coupled between said variable wavelength laser means and said storage medium for modulating a data field, comprising an array of data bits to be written into said storage medium, onto said writing beam, wherein
said data specifying means includes means for encoding said data field as an array of ordered pairs of essentially bright and essentially dark pixels, wherein said data bits having a first logical state are encoded as an ordered pair consisting of an essentially dark pixel and an essentially bright pixel, and said data its having a second logical state are encoded as an ordered pair consisting of an essentially bright pixel and an essentially dark pixel.

37. A system according to claim 36 in which said data specifying means includes means for specifying an all-inclusive condition within said data field, said all-inclusive condition being specified as an ordered pair consisting of a first essentially dark pixel and a second essentially dark pixel.

38. A system according to claim 36 in which said data specifying means further includes phase encoding means or modulating the writing beam by rotating the polarity of said coherent beam of light.

39. A system according to claim 38 in which said data specifying means includes a two-dimensional array of liquid crystal spatial light modulator elements, wherein each of said modulator elements corresponds to said essentially bright or said essentially dark pixel to be impressed onto said coherent beam of light.

40. A system according to claim 39 in which each of said modulator elements includes polarization means, responsive to a voltage control signal, for impressing said essentially bright and essentially dark pixels onto said coherent beam of light by rotating said coherent beam of light.

41. A system according to claim 40 in which said polarization means includes means, responsive to said voltage control signal, for impressing said essentially bright pixel onto said coherent beam of light by rotating said coherent beam of light.

42. A system according to claim 41 in which said polarization means includes means, responsive to said voltage control signal, for impressing said essentially bright pixel onto said coherent beam of light by a first polarization and passing said coherent beam of light through said modulator element, and rotating said coherent beam of light by a second polarization and passing it through said modulator element.

43. A system according to claim 42 in which said polarization means includes means, responsive to said voltage control signal, for impressing said essentially dark pixel onto said coherent beam of light by blocking said coherent beam of light from passing through said modulator element.

44. A system according to claim 39 in which said system includes polarity control means, coupled to said liquid crystal spatial light modulator elements for selecting at each modulator element any of a first polarization and a second polarization to be impressed onto said coherent beam of light.

45. A system according to claim 44 in which said system includes correlation means for correlating data, stored in said holographic medium and having a particular polarization, with test data and for signaling said polarity control means to update said polarization of said data stored in said holographic medium in response to said correlation.

46. A system according o claim 38 in which said data specifying means includes page address labeling means for writing into said storage medium, with each of said array of data bits, said data field having a wavelength address label stored in a specified portion of said array of data bits, and means for encoding at least one bit included in said address label as an ordered pair consisting of a first essentially bright pixel having a first specified polarization and a second essentially bright pixel having a second specified polarization.

47. A system according to claim 46 in which said system includes wavelength detection means for determining the wavelength of said coherent beam of light by reading that wavelength address label stored at a wavelength address, in said storage medium, corresponding to the wavelength of said coherent beam of light.

48. A system according to claim 47 in which all of said wavelength address labels are identical and said system includes means for determining the wavelength of said coherent beam of light by applying to said storage mans said search argument which matches said address label and by detecting the position of a resulting point image on an output plane.

49. An optical interconnection system for storing an interconnection matrix selectably interconnecting an input memory element and an output memory element, each memory element having a set of memory cells arranged in at least two dimensions, the system comprising optical storage means including a multi-dimensional holographic storage medium for storing a plurality of holographic images representative of digital data fields, variable wavelength writing laser means coupled to said storage medium for generating first and second coherent beams of light at a specified wavelength address, input connection specifying means coupled between said variable wavelength laser means and said storage medium for modulating a first data field, comprising a first array of data bits indicative of active input memory element locations to be interconnected with active output memory element locations, onto said first coherent light beam, and for coupling said first coherent light beam over a first optical path to said holographic storage medium, and output connection specifying means coupled between said variable wavelength laser means and said storage medium for modulating a second data field, comprising a second array of data bits indicative of active output memory element locations, onto said second coherent light beam, and for coupling said second coherent light beam over a second optical path to said holographic storage medium, and wherein said input connection specifying means includes means for encoding said first array of data bits as a first array of ordered pairs of essentially bright and essentially dark pixels, said data bits in said first array which have a first logical state being encoded as an ordered pair consisting of an essentially dark pixel and an essentially bright pixel, and said data bits in said first array which have a second logical state being encoded as an ordered pair consisting of an essentially bright pixel and an essentially dark pixel, and means for modulating said first array of ordered pairs onto said first coherent beam of light, and said output connection specifying means includes means for encoding said second array of data bits as a second array of ordered pairs of essentially bright and essentially dark pixels, said data bits in said second array which have a first logical state being encoded as an ordered pair consisting of an essentially dark pixel and an essentially bright pixel, and said data bits in said second array which have a second logical state being encoded as an ordered pair consisting of an essentially bright pixel and an essentially dark pixel, and means for modulating said second array of ordered pairs onto said second coherent beam of light.

50. A system according to claim 49 in which at least one of said input connection specifying means and said output connection specifying means includes phase encoding means for encoding phase information by selectively rotating the polarity of at least one of said first coherent beam of light and said second coherent beam of light.

51. A system according to claim 50 in which at least one of said input connection specifying means and said output connection specifying means includes a two-dimensional array of liquid crystal spatial light modulator elements, wherein each of said modulator elements corresponds to said essentially bright or said essentially dark pixel to be impressed onto at least one of said first coherent beam of light and said second coherent beam of light.

52. A system according to claim 51 in which each of said modulator elements includes polarization means, responsive to a voltage control signal for impressing said essentially bright and essentially dark pixels onto the coherent beam of light by rotating that coherent beam of light.

53. A system according to claim 52 in which said polarization means includes means, responsive to said voltage control signal, for impressing said essentially bright pixel onto at least one of said first and second coherent beams of light by rotating that coherent beam of light by a first polarization and passing that coherent beam of light through said modulator element.

54. A system according to claim 53 in which said polarization means includes means, responsive to said voltage control signal, for impressing said essentially bright pixel onto at least one of said first and second coherent beams of light by rotating that coherent beam of light by a second polarization and passing that coherent beam of light through said modulator element.

55. A system according to claim 54 in which said polarization means includes means, responsive to said voltage control signal, for impressing said essentially dark pixel onto a coherent beam of light by blocking said coherent beam of light from passing through said modulator element.

56. A system according to claim 51 in which at least one of aid input connection specifying means and said output connection specifying means includes page address labeling means for writing into said storage medium, with each of said array of data bits, said data field having a wavelength address label stored in a specified portion of said array of data bits, and means for encoding at least one bit included in said address label as an ordered pair consisting of a first essentially bright pixel having a first specified polarization and a second essentially bright pixel having a second specified polarization.

57. A system according to claim 56 in which said system includes wavelength detection means for determining the wavelength of said coherent beam of light by reading that wavelength address label stored at a wavelength address, in said storage medium, corresponding to the wavelength of said coherent beam of light.

58. A system according to claim 57 in which all of said wavelength address labels are identical and said system includes means for determining the wavelength of said coherent beam of light by applying to said storage means a search argument which matches said address label and by detecting the position of a resulting point image on an output plane.

59. A system according to claim 51 in which said system includes polarity control means, coupled to said liquid crystal spatial light modulator elements for selecting at each modulator element any of a first polarization and a second polarization to be impressed onto said coherent beam of light.

60. A system according to claim 59 in which said system includes correlation means for correlating data stored in said holographic medium and having a particular polarization with test data, and for signaling said polarity control means to update said polarization of said data stored in said holographic medium in response to said correlation.

61. A system according to claim 50 in which at least one or said input connection specifying means and said output connection specifying means includes means or specifying an all-inclusive condition within said data field, said all-inclusive condition being specified as an ordered pair consisting of a first essentially dark pixel and a second essentially dark pixel.

* * * * *

UNITED STATES PATENT AND TRADEMARK OFFICE
CERTIFICATE OF CORRECTION

PATENT NO. : 5,319,629
DATED : June 7, 1994
INVENTOR(S) : Philip D. Henshaw and Steven A. Lis It is certified that error appears in the above-identified patent and that said Letters Patent is hereby corrected as shown below:

Column 4, line 41, replace "passing through" with --passing through the pixel--.

Column 4, line 56, between "additional" and "for holographic" insert "techniques and systems for modulating digital data".

Column 10, line 44, between "In" and "is" insert "accordance with the invention, a different wavelength".

Column 11, line 62, between "in the" and "irradiation" insert "in the absorption band at the spectral position 606 of the".

Column 15, line 53, replace "systems" with --systems.--.

Column 15, line 57, replace "system" with --system.--.

Column 15, line 60, replace "systems" with --systems.--.

Column 16, line 22, replace "elements" with --elements.--.

Column 16, line 47, replace "recorded" with --recorded.--.

UNITED STATES PATENT AND TRADEMARK OFFICE
CERTIFICATE OF CORRECTION

PATENT NO. : 5,319,629
DATED : June 7, 1994
INVENTOR(S) : Philip D. Henshaw and Steven A. Lis It is certified that error appears in the above-identified patent and that said Letters Patent is hereby corrected as shown below:

Claim 5, line 6, replace "stage" with --state--.

Claim 9, line 1, replace "aim" with --claim--.

Claim 9, line 9, replace "of" with --by--.

Claim 38, line 2, replace "specifying" with --for specifying--.

Claim 48, line 5, replace "mans" with --means--.

Claim 56, line 2, replace "aid" with --said--.

Claim 61, line 2, replace "or" with --of--.

Claim 61, line 3, replace "or" with --for--.

Signed and Sealed this

Twelfth Day of December, 1995

Attest:

BRUCE LEHMAN

Attesting Officer

Commissioner of Patents and Trademarks